US012764351B2

(12) United States Patent
Link

(10) Patent No.: US 12,764,351 B2
(45) Date of Patent: Oct. 13, 2026

(54) SYSTEMS AND METHODS FOR DYNAMIC STITCHING OF ADVERTISEMENTS IN LIVE STREAM CONTENT

(71) Applicant: SnifferCat, Inc., Los Angeles, CA (US)

(72) Inventor: Thomas Hamilton Link, Pasadena, CA (US)

(73) Assignee: SnifferCat, Inc., Los Angeles, CA (US)

( * ) Notice: Subject to any disclaimer, the term of this patent is extended or adjusted under 35 U.S.C. 154(b) by 0 days.

(21) Appl. No.: 19/067,134

(22) Filed: Feb. 28, 2025

(65) Prior Publication Data

US 2025/0203133 A1 Jun. 19, 2025

Related U.S. Application Data

(63) Continuation of application No. 18/587,223, filed on Feb. 26, 2024, now Pat. No. 12,267,535, which is a
(Continued)

(51) Int. Cl.
*H04N 21/234* (2011.01)
*G06Q 30/0241* (2023.01)
(Continued)

(52) U.S. Cl.
CPC ... *H04N 21/23424* (2013.01); *G06Q 30/0277* (2013.01); *H04L 65/1089* (2013.01);
(Continued)

(58) Field of Classification Search
CPC ......... H04N 21/23424; H04N 21/2187; H04N 21/26258; H04N 21/2668;
(Continued)

(56) References Cited

U.S. PATENT DOCUMENTS 6,100,941 A 8/2000 Nevenka et al.
6,615,039 B1 9/2003 Eldering
(Continued)

FOREIGN PATENT DOCUMENTS

CN 1582444 A 2/2005
CN 1665272 A 9/2005
(Continued)

OTHER PUBLICATIONS

International Application No. PCT/US2017/035235, International Search Report and Written Opinion dated Jun. 12, 2017.
(Continued)

*Primary Examiner* — Richard G Keehn
(74) *Attorney, Agent, or Firm* — Sheppard Mullin Richter & Hampton LLP

(57) ABSTRACT

Receiving a first portion of a live stream of a content item being either prerecorded or being captured from a live event, the content item comprising or to comprise a set of stream-enabled video segments, the first portion of the live stream comprising a first subset of stream-enabled video segments. Identifying insertion point(s) within at least one stream-enabled video segment. Generating a first playlist based on the one or more identified insertion points, the first playlist associated with at least a first sub-subset stream-enabled video segments. Providing the first playlist to a consumer system. Receiving a second portion of the live stream comprising a second subset of stream-enabled video segments. Receiving a second playlist associated with the second portion of the live stream. Updating the first playlist based on the second playlist, and providing the updated first playlist to the consumer system.

13 Claims, 15 Drawing Sheets

Related U.S. Application Data continuation of application No. 18/079,761, filed on Dec. 12, 2022, now Pat. No. 11,917,219, which is a continuation of application No. 17/689,485, filed on Mar. 8, 2022, now Pat. No. 11,528,515, which is a continuation of application No. 17/080,446, filed on Oct. 26, 2020, now Pat. No. 11,272,228, which is a continuation of application No. 16/552,264, filed on Aug. 27, 2019, now Pat. No. 10,820,021, which is a continuation of application No. 15/973,477, filed on May 7, 2018, now Pat. No. 10,397,620, which is a continuation-in-part of application No. 15/854,608, filed on Dec. 26, 2017, now Pat. No. 10,165,308, which is a continuation of application No. 15/438, 365, filed on Feb. 21, 2017, now Pat. No. 9,872,049, which is a continuation-in-part of application No. 15/232,561, filed on Aug. 9, 2016, now Pat. No. 9,743,156, which is a continuation of application No. 15/199,789, filed on Jun. 30, 2016, now Pat. No. 9,723,372.

(60) Provisional application No. 62/441,286, filed on Dec. 31, 2016.

(51) Int. Cl.

| | |
|---|---|
| ***H04L 65/1089*** | (2022.01) |
| ***H04L 65/612*** | (2022.01) |
| ***H04L 65/75*** | (2022.01) |
| ***H04N 21/2187*** | (2011.01) |
| ***H04N 21/262*** | (2011.01) |
| ***H04N 21/2668*** | (2011.01) |
| ***H04N 21/472*** | (2011.01) |
| ***H04N 21/81*** | (2011.01) |

(52) U.S. Cl.
CPC ............ *H04L 65/612* (2022.05); *H04L 65/75* (2022.05); *H04L 65/765* (2022.05); *H04N 21/2187* (2013.01); *H04N 21/26258* (2013.01); *H04N 21/2668* (2013.01); *H04N 21/47217* (2013.01); *H04N 21/812* (2013.01)

(58) Field of Classification Search
CPC ........... H04N 21/47217; H04N 21/812; G06Q 30/0277; H04L 65/1089; H04L 65/612; H04L 65/75; H04L 65/765
See application file for complete search history.

(56) References Cited

U.S. PATENT DOCUMENTS

| | | | | |
|---|---|---|---|---|
| 6,993,081 | B1 | 1/2006 | Brunheroto et al. | |
| 7,806,329 | B2 | 10/2010 | Dmitriev et al. | |
| 8,112,311 | B2 | 2/2012 | Hunter et al. | |
| 8,572,646 | B2 | 10/2013 | Haberman et al. | |
| 8,752,085 | B1 | 6/2014 | Brueck et al. | |
| 8,863,182 | B1 | 10/2014 | Sharifi | |
| 8,959,241 | B2 * | 2/2015 | Gupta .............. | H04N 21/23424 709/231 |
| 9,183,576 | B2 | 11/2015 | Cobb et al. | |
| 9,197,857 | B2 | 11/2015 | Versteeg et al. | |
| 9,426,543 | B1 | 8/2016 | Li | |
| 9,736,503 | B1 * | 8/2017 | Bakshi ............. | H04N 21/23424 |
| 10,171,844 | B2 | 1/2019 | Zhang et al. | |
| 2002/0083439 | A1 | 6/2002 | Eldering | |
| 2002/0100043 | A1 | 7/2002 | Lowthert et al. | |
| 2006/0075449 | A1 * | 4/2006 | Jagadeesan ...... | H04N 21/23424 725/112 |
| 2008/0307454 | A1 | 12/2008 | Ahanger et al. | |
| 2009/0013347 | A1 * | 1/2009 | Ahanger .......... | H04N 21/23424 725/36 |
| 2009/0067806 | A1 * | 3/2009 | Sengamedu ..... | H04N 21/23424 386/353 |
| 2009/0217318 | A1 * | 8/2009 | VerSteeg .......... | H04N 21/23424 725/32 |
| 2009/0265737 | A1 | 10/2009 | Issa et al. | |
| 2011/0119703 | A1 | 5/2011 | Schlack et al. | |
| 2012/0143660 | A1 | 6/2012 | Jiwang | |
| 2013/0166580 | A1 | 6/2013 | Maharajh et al. | |
| 2013/0291014 | A1 | 10/2013 | Mick, Jr. et al. | |
| 2014/0115625 | A1 | 4/2014 | McCoy et al. | |
| 2014/0195358 | A1 | 7/2014 | Beining | |
| 2014/0259048 | A1 | 9/2014 | Brueck et al. | |
| 2014/0344852 | A1 * | 11/2014 | Reisner ............ | H04N 21/23424 725/32 |
| 2015/0106841 | A1 | 4/2015 | Wolf et al. | |
| 2015/0382042 | A1 | 12/2015 | Wagenaar | |
| 2016/0182922 | A1 | 6/2016 | Forseca, Jr. et al. | |
| 2016/0205443 | A1 | 7/2016 | Ghadi et al. | |
| 2016/0294909 | A1 * | 10/2016 | Killick .................. | H04L 65/765 |
| 2016/0316234 | A1 | 10/2016 | Casey | |
| 2016/0337691 | A1 | 11/2016 | Prasad | |
| 2022/0248083 | A1 | 8/2022 | Shuai et al. | |

FOREIGN PATENT DOCUMENTS

| | | | |
|---|---|---|---|
| CN | 101072340 | A | 11/2007 |
| CN | 101796836 | A | 8/2010 |
| CN | 103024479 | A | 4/2013 |
| CN | 103299610 | A | 9/2013 |
| CN | 104066003 | A | 9/2014 |
| CN | 104488263 | A | 4/2015 |
| CN | 104662921 | A | 5/2015 |
| CN | 104967885 | A | 10/2015 |
| EP | 1959684 | A2 | 8/2008 |
| JP | 2014-086087 | A | 5/2014 |
| JP | 2015-165666 | A | 9/2015 |
| WO | 01/50296 | A2 | 7/2001 |

OTHER PUBLICATIONS

Kar, Mukta et al., "Digital Program Insertion for Local Advertising," Cable Television Laboratories, 1998.

* cited by examiner

SYSTEMS AND METHODS FOR DYNAMIC STITCHING OF ADVERTISEMENTS IN LIVE STREAM CONTENT

CROSS REFERENCE TO RELATED APPLICATIONS

This application is a continuation of U.S. patent application Ser. No. 18/587,223, filed Feb. 26, 2024, which is a continuation of U.S. patent application Ser. No. 18/079,761, filed Dec. 12, 2022, now U.S. Pat. No. 11,917,219, which is a continuation of U.S. patent application Ser. No. 17/689,485, filed Mar. 8, 2022, now U.S. Pat. No. 11,528,515, which is a continuation of U.S. patent application Ser. No. 17/080,446, filed Oct. 26, 2020, now U.S. Pat. No. 11,272,228, which is a continuation of U.S. patent application Ser. No. 16/552,264, filed Aug. 27, 2019, now U.S. Pat. No. 10,820,021, which is a continuation of U.S. patent application Ser. No. 15/973,477, filed May 7, 2018, now U.S. Pat. No. 10,397,620, which is a continuation-in-part of U.S. patent application Ser. No. 15/854,608, filed Dec. 26, 2017, now U.S. Pat. No. 10,165,308, which is a continuation of U.S. patent application Ser. No. 15/438,365, filed Feb. 21, 2017, now U.S. Pat. No. 9,872,049, which claims priority to U.S. Provisional Patent Application Ser. No. 62/441,286, filed Dec. 31, 2016 and is a continuation-in-part of U.S. patent application Ser. No. 15/232,561, filed Aug. 9, 2016, now U.S. Pat. No. 9,743,156, which is a continuation of U.S. patent application Ser. No. 15/199,789, filed Jun. 30, 2016, now U.S. Pat. No. 9,723,372. The above-referenced applications are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Technical Field

Embodiments of the present inventions relate generally to the field of live stream content. More specifically, embodiments of the present inventions relate to dynamically stitching advertisements in live stream content.

Description of Related Art

Over 400 original series were produced and distributed in 2015. Such a dramatic increase in content offerings has largely been due to an increase in on-demand content, e.g., streaming content. However, monetizing on-demand content has proven difficult. Typically, commercial advertisements are the primary source of monetization of streaming content.

On-demand service and solution companies (e.g., Brightcove, Freewheel, etc.) require manual insertion points to flag advertisement servers and insert commercials. For example, an operator may have to go through a video and manually flag various points in the video to insert commercials, which can be both time-consuming and expensive.

SUMMARY

The amount of original content (e.g., shows, movies, etc.) has increased dramatically over the past several years. On-demand service providers have given content providers (e.g., Young Hollywood) a platform for delivering their content on-demand without being restricted to conventional broadcast requirements (e.g., broadcast schedules, media format requirements, etc.). However, monetizing on-demand content has been problematic and expensive. For example, on-demand service providers typically require content providers to manually tag various points of a video to indicate locations for advertisements. For example, an operator may view a video and look for a sequence of black frames indicating a potential insertion point. Upon reaching a sequence of black frames, the operator can manually flag an insertion point. Such a process may be time consuming, expensive, and prone to error.

Some embodiments described herein include systems and methods for stitching advertisements in streaming content. For example, advertisements may be provided during playback of streaming content without requiring an operator to have previously tagged insertion points. In some embodiments, a server system scans streaming content for a set of sequential black frames. Upon locating a first black frame, a potential insertion point may be automatically registered (e.g., without requiring user input) by the server system, and the server system may scan for a next black frame. If the next frame is also a black frame, an insertion point may be automatically registered by the server system. Alternatively, if the next frame is a video content frame, as opposed to a black frame, the server system may clear the registered potential insertion point, and continue scanning for black frames. The server system may perform this process until an end of the streaming content is reached.

In some embodiments, one or more advertisements are provided in real-time for each of the registered insertion points. For example, a registered insertion point may trigger the server system to "pause" streaming of video content, and stream one or more advertisements instead of the video content. Streaming of video content may be resumed upon conclusion of the advertisements.

In various embodiments, a system comprises an advertisement provider interface engine configured to receive one or more advertisements. A content provider interface engine may be configured to receive an unmarked content item, the unmarked content item comprising a stream-enabled video including a set of sequential black frames. An insertion point detector engine may be configured to identify an insertion point based on a location of at least one black frame of the set of sequential black frames without requiring user input, the insertion point identified during streaming of the unmarked content item to a consumer system, the insertion point being ahead of a current playback point of the unmarked content item streaming to the consumer system. A content processing engine may be configured to stitch the one or more advertisements in the unmarked content item at the insertion point. A content delivery engine may be configured to stream the unmarked content item to a consumer system until the insertion point is reached, and stream the one or more advertisements to the consumer system when the insertion point is reached.

In some embodiments, the one or more advertisements comprise stream-enabled video.

In some embodiments, the insertion point detector engine is further configured to identify the insertion point in response to satisfaction of a predetermined threshold condition. In related embodiments, the predetermined threshold condition is satisfied if a diagonal portion of each frame of the set of sequential black frames comprises all black pixels.

In some embodiments, the content processing engine configured to stitch the one or more advertisements in the unmarked content item at the insertion point comprises the content processing engine configured to trigger the content delivery engine to stream one or more advertisements to the consumer system at the insertion point.

In some embodiments, the content processing engine configured to stitch the one or more advertisements in the unmarked content item at the insertion point comprises the content processing engine configured to modify the unmarked content item to add the one or more advertisements to the unmarked content item at the insertion point.

In some embodiments, the system further comprises a consumer profile manager configured to identify one or more consumer system attributes of the consumer system. In related embodiments, the advertisement provider interface engine is further configured to provide a request for the one or more advertisements based on the one or more consumer system attributes, the advertisement provider interface engine is configured to receive the one or more advertisements based on the one or more consumer system attributes. In related embodiments, the one or more advertisements are selected during streaming of the unmarked content item to the consumer system. In related embodiments, the content processing engine is further configured to modify a format of the one or more advertisements based on the one or more consumer system attributes, the format of the one or more advertisements modified during streaming of the unmarked content item to the consumer system. In related embodiments, the content processing engine is further configured to modify a format of the unmarked content item based on the one or more consumer system, and the content delivery engine is further configured to stream the modified unmarked content item to the consumer system until the delivery time is reached.

In various embodiments, a method comprises receiving one or more advertisements. An unmarked content item may be received, the unmarked content item comprising a stream-enabled video including a set of sequential black frames. An insertion point may be identified based on a location of at least one black frame of the set of sequential black frames without requiring user input, the insertion point identified during streaming of the unmarked content item to a consumer system, the insertion point being ahead of a current playback point of the unmarked content item streaming to the consumer system. The one or more advertisements may be stitched in the unmarked content item at the insertion point. The unmarked content item may be streamed to a consumer system until the insertion point is reached, and the one or more advertisements may be streamed to the consumer system when the insertion point is reached.

In some embodiments, the one or more advertisements comprise stream-enabled video.

In some embodiments, the method further comprising identifying the first black frame in response to satisfaction of a predetermined threshold condition. In related embodiments, the predetermined threshold condition is satisfied if a diagonal portion of the first black frame of the set of sequential black frames comprises all black pixels.

In some embodiments, the stitching the one or more advertisements in the unmarked content item at the insertion point comprises streaming the one or more advertisements to the consumer system at the insertion point without modifying the unmarked content item.

In some embodiments, the content processing engine configured to stitch the one or more advertisements in the unmarked content item at the insertion point comprises the content processing engine modifying the unmarked content item to add the one or more advertisements to the unmarked content item at the insertion point.

In some embodiments, the method further comprises identifying, by the server system, one or more consumer system attributes of the consumer system. In related embodiments, the method further comprises providing, by the server system, the one or more advertisements based on the one or more consumer system attributes, the receiving the one or more advertisements comprising receiving the one or more advertisements based on the consumer system attributes. In related embodiments, the one or more advertisements are selected during streaming of the unmarked content item to the consumer system.

In some embodiments, the method further comprises modifying a format of the one or more advertisements based on the one or more consumer system attributes, the format of the one or more advertisements being modified during streaming of the unmarked content item to the consumer system.

In some embodiments, the method further comprises modifying a format of the unmarked content item based on the one or more consumer system, and streaming the modified unmarked content item to the consumer system until the delivery time is reached.

In various embodiments, a non-transitory computer readable medium comprises executable instructions, the instructions being executable by a processor to perform a method, the method comprising receiving one or more advertisements. An unmarked content item may be received, the unmarked content item comprising a stream-enabled video including a set of sequential black frames. An insertion point may be identified based on a location of at least one black frame of the set of sequential black frames without requiring user input, the insertion point identified during streaming of the unmarked content item to a consumer system, the insertion point being ahead of a current playback point of the unmarked content item streaming to the consumer system. The one or more advertisements may be stitched in the unmarked content item at the insertion point. The unmarked content item may be streamed to a consumer system until the insertion point is reached, and the one or more advertisements may be streamed to the consumer system when the insertion point is reached.

In various embodiments, systems, methods, and non-transitory computer readable media are configured to receive an unmarked content item, the unmarked content item comprising a plurality of stream-enabled video segments, at least one stream-enabled video segment of the plurality of stream-enabled video segments including a set of sequential black frames; identify one or more insertion points for the at least one stream-enabled video segment of the plurality of stream-enabled video segments, the identification based on one or more locations of at least one black frame of the set of sequential black frames without requiring user input; discard at least some of the plurality of stream-enabled video segments that do not include at least one set of sequential black frames; remove the one or more sets of sequential black frames from the at least one stream-enabled video segment of the plurality of stream-enabled video segments including the one or more sets of sequential black frames; generate a playlist, the playlist comprising a first streaming source location associated with the at least some of the plurality of stream-enabled video segments that do not include at least one set of sequential black frames, a second streaming source location associated with the at least one stream-enabled video segment of the plurality of stream-enabled video segments having a removed set of sequential black frames, and a third streaming source location associated with an advertisement provider system configured to provide one or more stream-enabled advertisements to a consumer system; and provide the playlist to the consumer system, the playlist allowing the consumer system to first stream the at least some of the plurality of stream-enabled video segments that do not include at least one set of sequential black frames, the first stream received from the first streaming source location, second stream the at least one stream-enabled video segment of the plurality of stream-enabled video segments having a removed set of sequential black frames until a corresponding insertion point of the one or more insertion points is reached, the second stream received from the second streaming source location, and third stream the one or more stream-enabled advertisements when the corresponding insertion point of the one or more insertion points is reached, the third stream received from the third streaming source location.

In some embodiments, the one or more advertisements comprise stream-enabled video.

In some embodiments, the removing the one or more sets of sequential black frames from the at least one stream-enabled video segment of the plurality of stream-enabled video segments including the one or more sets of sequential black frames comprises modifying the at least one stream-enabled video segment of the plurality of stream-enabled video segments including the one or more sets of sequential black frames to remove the or more sets of sequential black frames an insert one or more respective tags indicating one or more respective insertion points.

In some embodiments, the first streaming source location comprises a content provider streaming source location. In some embodiments, the second streaming source location comprises a streaming source location of the system. In some embodiments, the third streaming source location comprises an advertisement provider streaming source location.

In some embodiments, the first streaming source location, the second streaming source location, and the third streaming source location each comprise a respective uniform resource locator (URL) having a different domain.

In various embodiments, systems, methods, and non-transitory computer readable media are configured to perform: receiving a live stream of a content item, the live stream of the content item comprising a plurality of stream-enabled video segments; receiving a first playlist associated with the live stream of the content item, the first playlist comprising a respective first location identifier for at least some of the plurality of stream-enabled video segments; identifying, at substantially the same time as the live stream of the content item is being received, one or more insertion points for at least one stream-enabled video segment of the plurality of stream-enabled video segments, the identifying based on a predetermined configuration of a type of insertion point detection; generating, in response to the identifying the one or more insertion points, a second playlist from the first playlist based on the one or more identified insertion points, the second playlist configured to facilitate live streaming to a consumer system, the second playlist comprising a second location identifier associated with a first portion of a first segment of the at least one stream-enabled segment of the plurality of stream-enabled video segments, a third location identifier associated with a second portion of the first segment of the at least one stream-enabled segment including the one or more insertion points, and a fourth location identifier associated with a stream-enabled advertisement; providing the second playlist to the consumer system; receiving a third playlist associated with the live stream of the content item, the third playlist identifying one or more subsequent stream-enabled video segments of the live stream of the content item; updating the second playlist based on the third playlist; and providing the updated second playlist to the consumer system.

In some embodiments, the live stream of the content item and the first playlist associated with the live stream of the content item are received over communication network from a content provider system.

In some embodiments, the respective first location identifiers are each associated with a first domain different from a second domain associated with the second and third location identifiers.

In some embodiments, the first domain is associated with a content provider system, and the fourth location identifier is associated with the second domain.

In some embodiments, the first domain is associated with a content provider system, and the fourth location identifier is associated with a third domain of an advertisement provider system.

In some embodiments, the live stream of the content item comprises a live stream of video on-demand content or a live stream of a live event.

In some embodiments, the type of insertion point detection comprises any of detecting a set of black frames and detecting interrupts.

In some embodiments, the providing the second playlist to the consumer system allows the consumer system to live stream the first portion of the first segment of the at least one stream-enabled segment including the one or more insertion points until an end of the first portion, the end of the first portion defined in accordance with a particular insertion point of the one or more insertion points, live stream the stream-enabled advertisement segment immediately following the end of the first portion of the first segment, and live stream the second portion of the first segment of the at least one stream-enabled segment including the one or more insertion points until an end of the second portion of the first segment.

In some embodiments, the first and second portions of the first segment are live streamed from a same domain as the stream-enabled advertisement segment.

In some embodiments, the first and second portions of the first segment are live streamed from a different domain as the stream-enabled advertisement segment.

In some embodiments, the second playlist is updated in response to receiving an additional one or more stream-enabled segments of the live stream of the content item.

In some embodiments, the second playlist is updated in response to user input.

In some embodiments, the invention provides a system comprising one or more processors; and memory storing instructions that, when executed by the one or more processors, cause the system to perform receiving a first portion of a live stream of a content item, the content item comprising or to comprise a set of stream-enabled video segments, the first portion of the live stream of the content item comprising a first subset of stream-enabled video segments of the set of stream-enabled video segments of the content item; receiving a first playlist associated with the first subset of stream-enabled video segments of the first portion of the live stream of the content item, the first playlist comprising a respective first location identifier for each of the first subset of stream-enabled video segments of the first portion of the live stream of the content item; identifying one or more insertion points within at least one stream-enabled video segment of the first subset of stream-enabled video segments of the first portion of the live stream of the content item; generating, in response to the identifying the one or more insertion points, a second playlist from the first playlist based on the one or more identified insertion points, the second playlist associated with at least a first sub-subset of the first subset of stream-enabled video segments of the first portion of the live stream of the content item; providing the second playlist to a consumer system; receiving a second portion of the live stream of the content item, the second portion of the live stream of the content item comprising a second subset of stream-enabled video segments of the set of stream-enabled video segments of the content item; receiving a third playlist associated with the second portion of the live stream of the content item, the third playlist comprising a respective second location identifier for each of the second subset of stream-enabled video segments of the second portion of the live stream of the content item; updating the second playlist based on the third playlist; and providing the updated second playlist to the consumer system.

The live stream of the content item and the first playlist associated with the live stream of the content item may be received over communication network from a content provider system. Each respective first location identifier may be associated with a first domain different from a second domain associated with the system. The first domain may be associated with a content provider system. The second playlist may include a particular location identifier associated with the system and a particular location identifier associated with a content provider. The second playlist may include a particular location identifier associated with the system and a particular location identifier associated with an advertisement provider. The second playlist may include a particular location identifier associated with the system, a particular location identifier associated with an a content provider, and a particular location identifier associated with an advertisement provider. The live stream of the content item may comprise a live stream of video on-demand content or a live stream of a live event. The instructions for causing the system to identify one or more insertion points may comprise instructions for causing the system to detect one or more black frames or instructions for causing the system to detect one or more interrupts.

In some embodiments, the invention may provide a method, comprising receiving a first portion of a live stream of a content item, the content item comprising or to comprise a set of stream-enabled video segments, the first portion of the live stream of the content item comprising a first subset of stream-enabled video segments of the set of stream-enabled video segments of the content item; receiving a first playlist associated with the first subset of stream-enabled video segments of the first portion of the live stream of the content item, the first playlist comprising a respective first location identifier for each of the first subset of stream-enabled video segments of the first portion of the live stream of the content item; identifying one or more insertion points within at least one stream-enabled video segment of the first subset of stream-enabled video segments of the first portion of the live stream of the content item; generating, in response to the identifying the one or more insertion points, a second playlist from the first playlist based on the one or more identified insertion points, the second playlist associated with at least a first sub-subset of the first subset of stream-enabled video segments of the first portion of the live stream of the content item; providing the second playlist to a consumer system; receiving a second portion of the live stream of the content item, the second portion of the live stream of the content item comprising a second subset of stream-enabled video segments of the set of stream-enabled video segments of the content item; receiving a third playlist associated with the second portion of the live stream of the content item, the third playlist comprising a respective second location identifier for each of the second subset of stream-enabled video segments of the second portion of the live stream of the content item; updating the second playlist based on the third playlist; and providing the updated second playlist to the consumer system.

In some embodiments, the invention may provide a non-transitory computer readable medium comprising executable instructions, the instructions being executable by a processor to perform a method, the method comprising receiving a first portion of a live stream of a content item, the content item comprising or to comprise a set of stream-enabled video segments, the first portion of the live stream of the content item comprising a first subset of stream-enabled video segments of the set of stream-enabled video segments of the content item; receiving a first playlist associated with the first subset of stream-enabled video segments of the first portion of the live stream of the content item, the first playlist comprising a respective first location identifier for each of the first subset of stream-enabled video segments of the first portion of the live stream of the content item; identifying one or more insertion points within at least one stream-enabled video segment of the first subset of stream-enabled video segments of the first portion of the live stream of the content item; generating, in response to the identifying the one or more insertion points, a second playlist from the first playlist based on the one or more identified insertion points, the second playlist associated with at least a first sub-subset of the first subset of stream-enabled video segments of the first portion of the live stream of the content item; providing the second playlist to a consumer system; receiving a second portion of the live stream of the content item, the second portion of the live stream of the content item comprising a second subset of stream-enabled video segments of the set of stream-enabled video segments of the content item; receiving a third playlist associated with the second portion of the live stream of the content item, the third playlist comprising a respective second location identifier for each of the second subset of stream-enabled video segments of the second portion of the live stream of the content item; updating the second playlist based on the third playlist; and providing the updated second playlist to the consumer system.

DETAILED DESCRIPTION

The amount of original content (e.g., shows, movies, etc.) has increased dramatically over the past several years. On-demand service providers have given content providers (e.g., Young Hollywood) a platform for delivering their content on-demand without being restricted to conventional broadcast requirements (e.g., broadcast schedules, media format requirements, etc.). However, monetizing on-demand content has been problematic and expensive. For example, on-demand service providers typically require content providers to manually tag various points of a video to indicate locations for advertisements. For example, an operator may view a video and look for a sequence of black frames indicating a potential insertion point. Upon reaching a sequence of black frames, the operator can manually flag an insertion point. Such a process may be time-consuming, expensive, and prone to error.

Some embodiments described herein include systems and methods for stitching advertisements in streaming content. For example, advertisements may be provided during playback of streaming content without requiring an operator to have previously tagged insertion points. In some embodiments, a server system scans streaming content for a set of sequential black frames. In some embodiments, an insertion point may be automatically registered (e.g., without requiring user input) by the server system upon locating a first black frame. In some embodiments, an insertion point may be automatically registered by the server system only upon detecting a second black frame. In some embodiments, the server system may ignore any sequential black frames thereafter. In some embodiments, an insertion point may be automatically registered by the server system upon locating the last black frame in a sequence of one or more black frames. In some embodiments, the server system may look to see if the next frame is also a black frame, and automatically register the insertion point only if the next frame is a video content frame, as opposed to a black frame. In some embodiments, if the next frame is another black frame, the server system may clear a previous potential insertion point and generate a new insertion point at the next black frame. The server system may perform this process until an end of the streaming content is reached.

In some embodiments, one or more advertisements are provided in real-time for each of the registered insertion points. For example, a registered insertion point may trigger the server system to "pause" streaming of video content, and stream one or more advertisements before resuming the video content upon conclusion of the advertisements.

Figure 1:
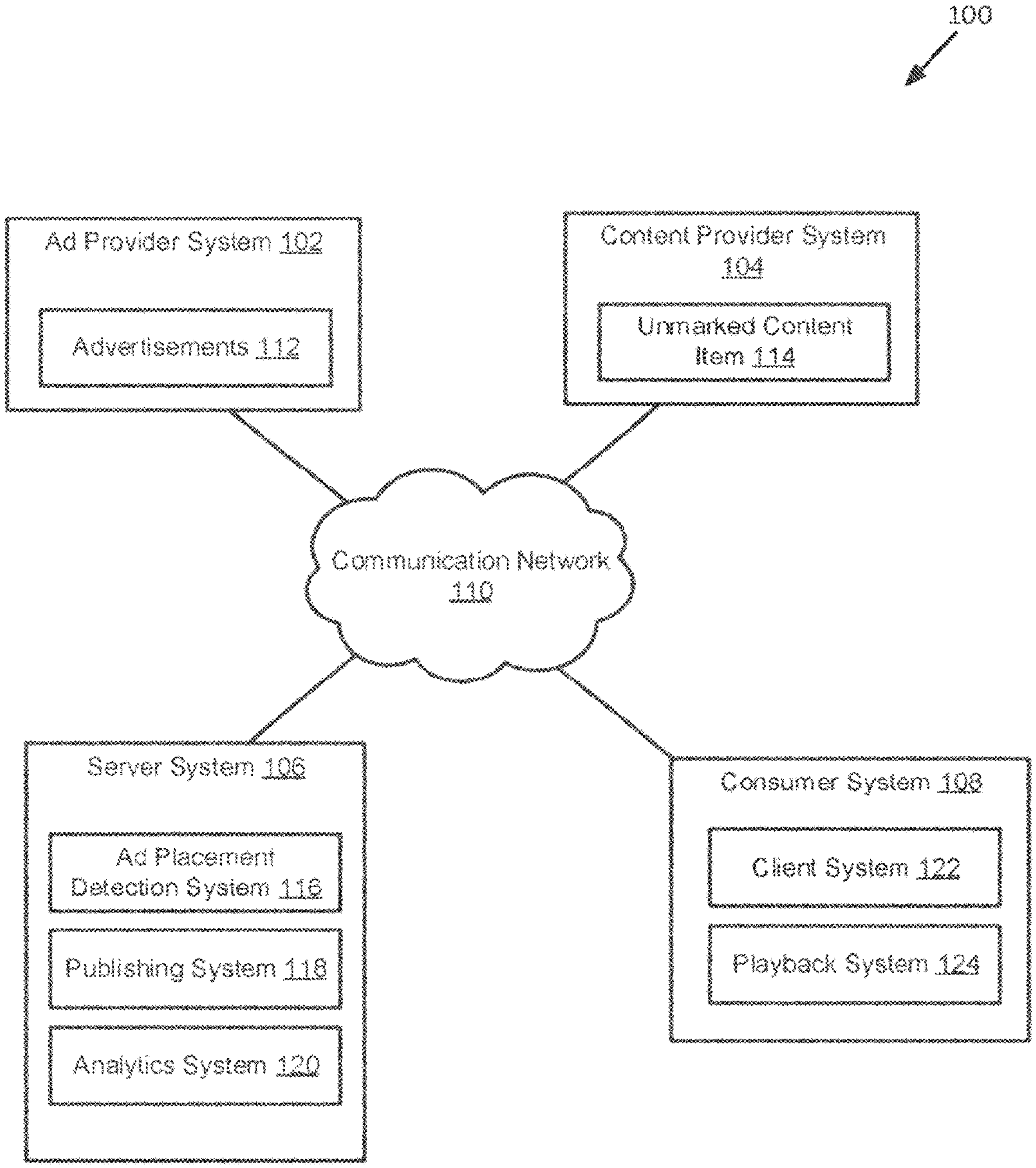
FIG. 1 depicts a block diagram illustrating a content delivery network system according to some embodiments.

FIG. 1 depicts a block diagram illustrating a content delivery network system 100 according to some embodiments. The system 100 includes an advertisement provider system 102, a content provider system 104, a server system 106, a consumer system 108, and a communication network 110.

The advertisement provider system 102 may be configured to store and provide advertisements 112. For example, the advertisements 112 may be video commercials that may be streamed at various points during playback of streaming content. As used in this paper, streaming content may include transactional video on demand content (or, "TVOD" content), over-the-top content (or, "OTT" content), advertisement supported video on demand content (or, "AVOD" content), subscription video on demand content (or, "SVOD" content), and the like. In some embodiments, functionality of the advertisement provider system 102 is performed by one or more workstations, desktop computers, laptop computers, mobile devices, or the like. It will be appreciated that one advertisement provider system 102 is shown for illustrative purposes, but other embodiments may include any number of such advertisement provider systems 102.

In some embodiments, the advertisement provider system 102 comprises a cloud-based system. For example, the advertisement provider system 102 may comprise a remote system. Alternatively, the advertisement provider system 102 may comprise a local system. For example, the advertisement provider system 102 may store local instances of advertisements retrieved from a remote system.

The content provider system 104 may be configured to store and provide unmarked content items 114. In some embodiments, functionality of the content provider system 104 is performed by one or more workstations, desktop computer, laptop computers, mobile devices, or the like. It will be appreciated that one content provider system 104 is shown for illustrative purposes, but other embodiments may include any number of such content provider systems 104.

In some embodiments, the unmarked content items 114 include stream-enabled videos (e.g., an episode of a show, a movie, or the like), or other on-demand content. As used in this paper, "unmarked" may indicate a content item includes frames of content (e.g., video content frames), and sets of indicator frames, but does not include timing information (e.g., time stamps) indicating when advertisements may be inserted in the content item and/or otherwise provided to a consumer in connection with streaming content. In some embodiments, the sets of indicator frames include frames that are each made up entirely of black pixels, and are used to determine when advertisements may be inserted in an unmarked content item and/or otherwise provided to a consumer system in connection with streaming unmarked content items. As follows, "marked" content items may include timing information indicating when advertisements may be inserted in the content item and/or otherwise provided to a consumer system in connection with streaming the marked content item.

In some embodiments, the content provider system 104 comprises a cloud-based system. For example, the content provider system 104 may comprise a Young Hollywood® system remote from other systems. Alternatively, the content provider system 104 may comprise a local system. For example, the content provider system 104 may store a local library of unmarked content items retrieved from a remote system, or otherwise.

The server system 106 may be configured to stitch one or more advertisements into playback of an unmarked content item. For example, functionality of the server system 106 may be performed by one or more workstations, desktop computers, laptop computers, mobile devices, or the like. In some embodiments, stitching may include automatically (e.g., without requiring user input) determining where advertisements may be inserted in an unmarked content item and/or otherwise be provided in connection with streaming unmarked content items. For example, the server system 106 may process a portion of a content item (e.g., a cached portion or streamed portion) until it identifies a sequence of black frames (e.g., two or more sequential frames, 1 second of black frames, etc.), and indicate that an advertisement should be provided at the identified position of the unmarked content item during playback.

In some embodiments, stitching may include adding an advertisement to an unmarked content item, although other embodiments may not add the advertisement to the unmarked content item. For example, stitching may indicate playback of the content item should be paused at a particular location (e.g., based on a location of sequential black frames), and one or more advertisements should be streamed while content playback is paused. Playback of the content item may be resumed upon conclusions of the one or more advertisements.

In some embodiments, the server system 106 is configured to stitch one or more advertisements in segments (or, "chunks") of an unmarked content item. For example, an unmarked content item may include 25 segments. The server system 106 may only process and/or store the segments known to have an insertion point (e.g., segments 4, 10, 11, 19, and 22-24). This may help, for example, reduce a load on the server system 106 by allowing other systems (e.g., the content provider system 104) to handle the remaining segments. Further discussion of segments may be found throughout this paper (e.g., with reference to FIGS. 8-10).

In some embodiments, the server system 106 includes an advertisement placement detection system 116, a publishing system 118, and an analytics and reporting system 120. The advertisement placement detection system 116 may be configured to process unmarked content items to detect, or otherwise identify, insertion points to provide one or more advertisements. In some embodiments, the advertisement placement detection system 116 scans a cached or buffered portion of an unmarked content item for an insertion point, e.g., a particular type of frame, a particular set of frames, a sequence of black frames or the like. For example, the advertisement placement detection system 116 may scan for a first black frame of the unmarked content item, a second black frame of the unmarked content item, a last black frame in a sequence of black frames of the unmarked content items, a time period (e.g., a second) of black frames of the unmarked content items, etc. When the insertion point is located, the advertisement placement detection system 116 may register the insertion point.

In some embodiments, the advertisement placement detection system 116 may reduce errors caused by incorrectly flagging multiple insertion points for a single intended insertion point. In some embodiments, the advertisement placement detection system 116 may cancel insertion points if they are back to back. For example, if a next frame after an insertion point is detected is also a black frame, it may be ignored (and possibly removed). This may help reduce errors during the stitching process. Subsequent black frames may be ignored and/or removed until the next frame of the unmarked content item comprises a non-black-frame, e.g., video content frame. Once a video content frame is located, the advertisement placement detection system 116 may reset and begin scanning for another first black frame, and the above process may be repeated.

In some embodiments, the advertisement placement detection system 116 may cancel insertion points if they are too close together, e.g., occurring within 10 minutes of the previous insertion point. In other embodiments, the advertisement placement detection system 116 may cancel insertion points if they are within a period of time set by a user, if they are within a configurable time period set by a manager of the server system 106, if they are within a period of time set according to a subscription-level of the viewer (e.g., one subscription level may provide advertisements no more often than every 10 minutes, one subscription level may provide advertisement no more often than every 30 minutes, one subscription level may never offer advertisements, etc.).

In some embodiments, the publishing system 118 is configured to stitch advertisements into content, and stream the stitched content. For example, the publishing system 118 may receive an unmarked content item, cache or buffer a portion of the unmarked content item, evaluate the unmarked content item for insertion points, provider consumer system attributes for receiving targeted advertisements, insert the advertisements into the insertion points, and stream the stitched content. In some embodiments, the publishing system 118 may stop, or pause, streaming of the unmarked content item while streaming advertisements, although other embodiments may stream both simultaneously, e.g., to allow the consumer to buffer a portion of the unmarked content item while the one or more advertisements are being played.

In some embodiments, the publishing system 118 is configured to format advertisements and unmarked content items without requiring input from a user (e.g., an operator). For example, the publishing system 118 may receive consumer system attributes of a consumer system, such as an operating system type, a playback player type, a browser type, a network connection speed, a screen display size and/or resolution, and so forth. The publishing system 118 may format the advertisements and unmarked content items based on the consumer system attributes. In some embodiments, the advertisements and unmarked content items are pre-formatted, and are not formatted by the publishing system 118, or other component of the server system 106.

In some embodiments, the analytics and reporting system 120 is configured to analyze and report streaming attributes of a streaming session (e.g., streaming a particular unmarked content item), streaming sessions associated with a particular consumer system, streaming sessions associated with group of consumer systems, and the like. For example, streaming attributes may include the duration of a streaming session, a number of advertisements provided during a stream session, the number of advertisements provided for each advertising segment of a streaming session, and so forth. An advertisement segment may include the one or more advertisements associated with a particular insertion point. For example, three advertisements may be stitched in an unmarked content item for a single insertion point.

In some embodiments, the analytics and reporting system 120 generates predictive models for determining how many advertisements to stitch for each insertion point, and which consumer system attributes to provide for selection of advertisements. For example, the analytics and reporting system 120 may log that a particular consumer system was provided with three different advertisement segments during streaming of an unmarked content item. The analytics and reporting system 120 may log the number of click-throughs generated by the advertisements, and/or the number of advertisements that were fast-forward or skipped. For example, if advertisements in a particular segment resulted in less click-throughs and/or more fast-forwards or skips than segments with two advertisements, then the predictive model may indicate that two advertisements should be provided per segment.

In some embodiments, the predictive model may be predefined (e.g., for a particular consumer system or a group of consumer systems), although in other embodiments, the predictive model may be dynamic. For example, as consumer system attributes and/or streaming attributes change, the predictive model may be updated. This may allow, for example, the analytics and reporting system 120 to provide more accurate metrics, and account for streaming habits of particular consumer systems.

In some embodiments, the server system 106 comprises a cloud-based system. For example, the server system 106 may comprise an AWS system remote from other systems. Alternatively, the server system 106 may comprise a local system connected to one or more other systems through local area connections and/or wide area connections.

The consumer system 108 may be configured to stream and playback unmarked content items and advertisements. For example, functionality of the consumer system 108 may be performed by one or more mobile device (e.g., smartphones, cell phones, smartwatches, tablet computers, or the like), desktop computers, laptop computers, workstations, or the like. In some embodiments, the consumer system 108 includes client system 122 and playback system 124. The consumer system 122 may be configured to receive and provide data (e.g., streaming data), generate graphical user interfaces, receive user inputs, and the like. For example, the client system 122 may comprise a web browser (e.g., IE, Firefox, Chrome, Safari, etc.).

The playback system 122 may be configured to playback streaming data, including unmarked content items and advertisements. In some embodiments, the streaming data comprises segments. For example, the playback system 122 may comprise a QuickTime® player, Real® player, web browser component, and the like. In some embodiments, the playback system 122 may be configured to perform a variety of different playback functions. For example, the playback system 122 may pause, terminate, advance (e.g., fast-forward or skip), or rewind unmarked content items and/or advertisements. In some embodiments, particular playback functions (e.g., fast-forward or skip) may be restricted. For example, a particular streaming session may only allow a limited number of fast-forwards or skips.

In some embodiments, the communication network 110 represents one or more computer networks (e.g., LAN, WAN, or the like). The communication network 110 may provide communication between any of the advertisement provider system 102, the content provider system 104, the server system 106, and the consumer system 108. In some implementations, the communication network 110 comprises computing devices, routers, cables, buses, and/or other network topologies. In some embodiments, the communications network 110 may be wired and/or wireless. In various embodiments, the communications network 110 may comprise the Internet, one or more networks that may be public, private, IP-based, non-IP based, and so forth.

Figure 2:
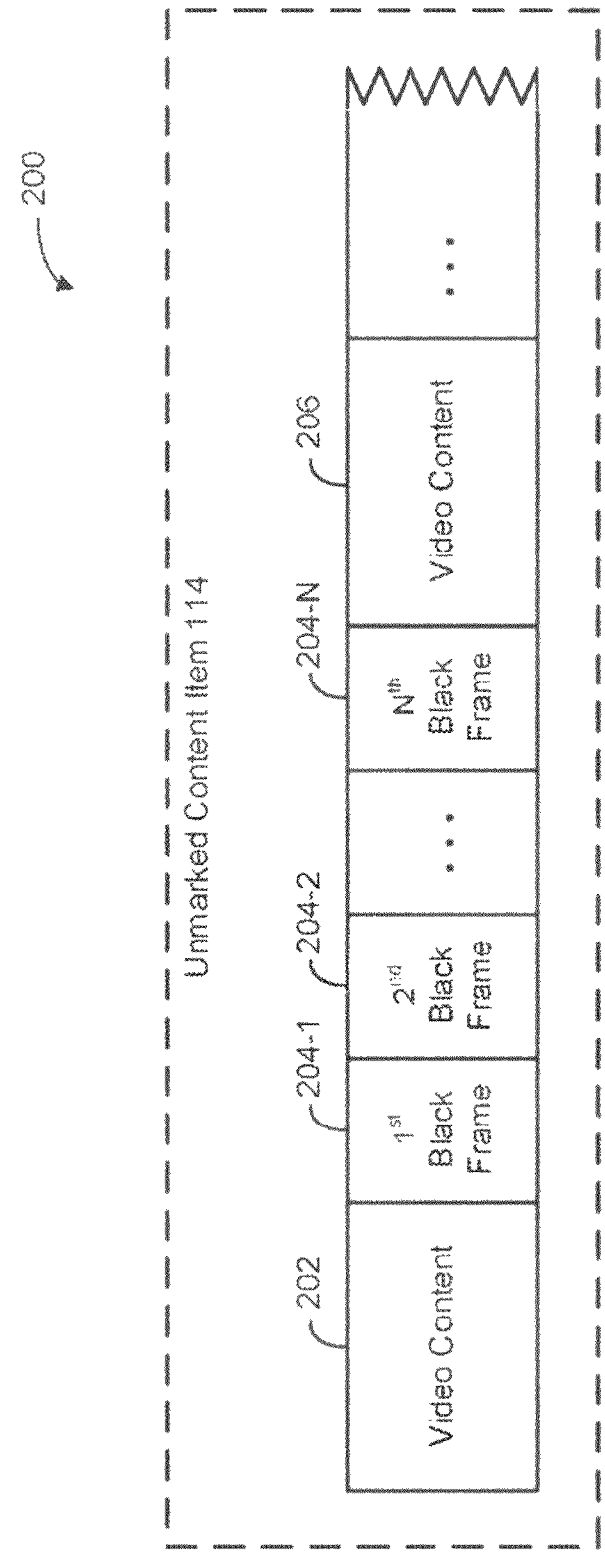
FIG. 2 depicts a block diagram illustrating details of an unmarked content item according to some embodiments.

FIG. 2 depicts a block diagram 200 illustrating details of an unmarked content item 114 according to some embodiments. The unmarked content item 114 includes a first video content portion 202, a set of black frames 204-1 to **204-*n*, and a second video content portion 206. It will be appreciated that the content item 114 may include any number of video content portions and sets of black frames. For example, the content item 114 may include six video content portions, and five sets of black frames, which may indicate the content item 114** is configured for five different advertisement segments. In various embodiments, one or more advertisements may be provided for each advertisement segment.

Figure 3:
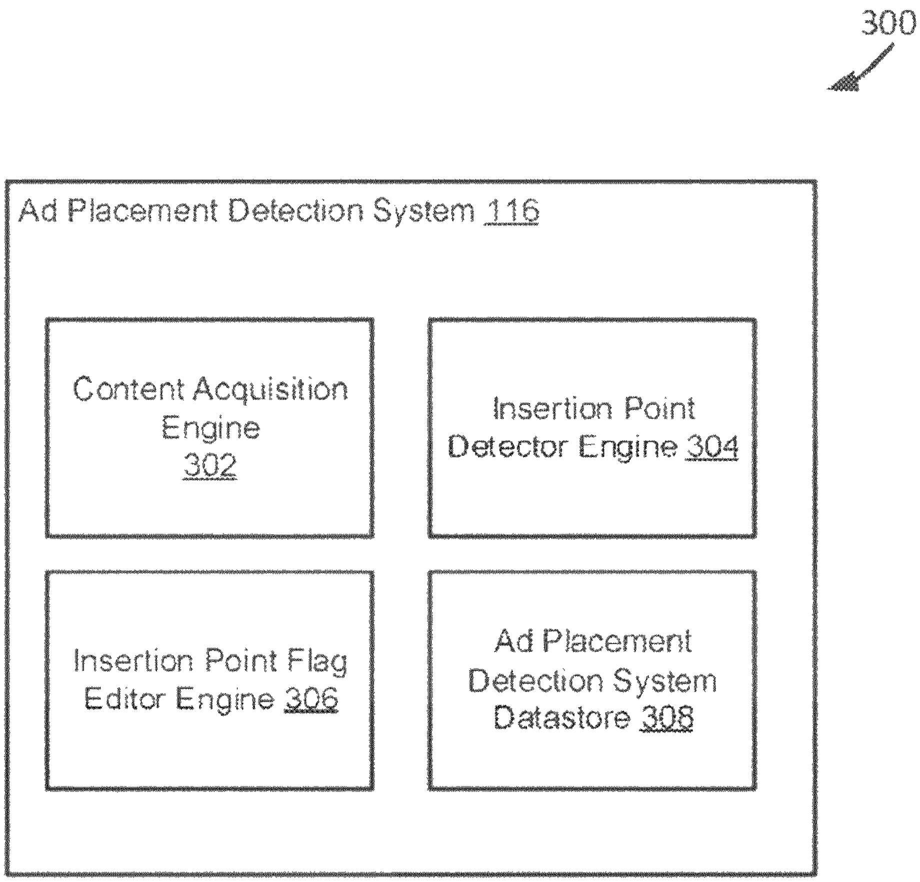
FIG. 3 depicts a block diagram illustrating details of the advertisement placement detection system according to some embodiments.

FIG. 3 depicts a block diagram 300 illustrating details of the advertisement placement detection system 116 according to some embodiments. In some embodiments, the advertisement detection system 116 includes a content acquisition engine 302, an insertion point detection engine 304, an insertion point flag editor engine 306, and an advertisement placement detection system datastore 308. Like many other elements noted herein, the insertion point flag editor 306 is optional.

The content acquisition engine 302 may be configured to acquire unmarked content items. In some embodiments, the content acquisition engine 302 receives a data stream of one or more unmarked content items. For example, the content acquisition engine 302 may comprise an implementation of the Real Time Streaming Protocol (RTSP). The acquired unmarked content items may be stored at least temporarily (e.g., cached or buffered) in the advertisement placement detection system datastore 308. As used in this paper, datastores may be any structure and/or structures suitable for storing data at least temporarily (e.g., a cache, a buffer, an active database, a relational database, a self-referential database, a table, a matrix, an array, a flat file, a documented-oriented storage system, a non-relational No-SQL system, an FTS-management system, and the like).

The insertion point detection engine 304 may be configured to detect insertion points of an unmarked content item for stitching one or more advertisements. In some embodiments, an insertion point indicates a position within the unmarked item. For example the insertion point detection engine 304 may scan a cached or buffered portion of the unmarked content item for a frame or set of frames having a particular set of one or more frame detection attributes (e.g., scan for a first black frame, a second black frame, an n-th black frame, a last frame within a sequence of one or more black frames, a time-period of black frames, etc.). In some embodiments, frame detection attributes include a pixel color (e.g., black). In some embodiments, the frame may be deemed to have the frame detection attribute, e.g., may be deemed to be black, if a threshold number, percentage or pattern of pixels have the attribute (e.g., all pixels are black, a diagonal of the frame is black, both diagonals are black, certain predetermined points are black, etc.).

The insertion point detection engine 304 may be configured to ignore some insertion points based on predetermined criteria, e.g., if the previous insertion point is within a certain number of frames or too proximate in time, if the previous insertion point is too proximate in time based on a subscription level of the user, or the like. In some embodiments, the insertion point detection engine 304 may register the insertion point, possibly along with timing information (e.g., 5 m:13 s of the unmarked content item 114). In some embodiments, the insertion point detection engine 304 may remove one or more frames with the set of one or more frame detection attributes (e.g., black frames) from the unmarked content item. In some embodiments, the insertion point detection engine 304 may ignore and/or remove any number of frames until a video content frame is reached. This process may help, for example, prevent erroneous insertion point detections.

The insertion point flag editor engine 306 may be configured to insert a custom frame indicating an insertion point for stitching one or more advertisements. For example, upon registering an insertion point based on locating a sequence of black frames, the insertion point flag editor engine 306 may replace the black frames with the custom frame. Then, in future passes, the insertion point detection engine 304 may scan an unmarked content item for a frame matching the custom frame. In some embodiments, the custom frame may comprise particular set of one or more frame detection attributes. For example, the custom frame may include a logo (e.g., a "SnifferCat" logo). This may be done in real-time, e.g., in connection with streaming of the unmarked content item, and/or it may done in an "offline" or batch process.

Figure 4:
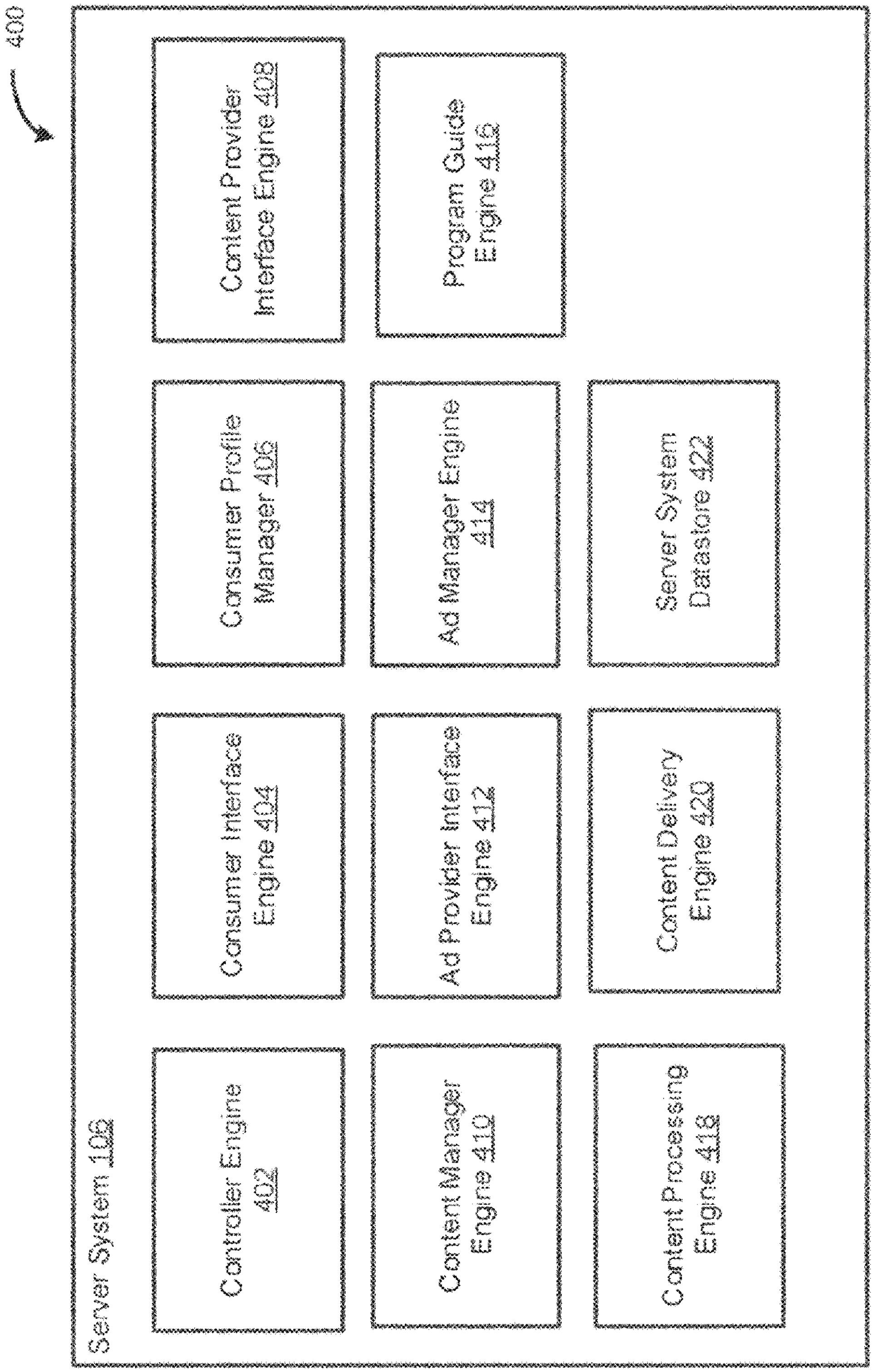
FIG. 4 depicts a block diagram illustrating details of the publishing system according to some embodiments.

FIG. 4 depicts a block diagram 400 illustrating details of the publishing system 118 according to some embodiments. In some embodiments, the publishing system 118 includes a controller engine 402, a consumer interface engine 404, a consumer profile manager 406, a content provider interface engine 408, a content manager engine 410, an advertisement provider interface engine 412, an advertisement manager engine 414, a program guide engine 416, a content and advertisement processing system (or, "content processing system") 418, a content and advertisement delivery system (or, "content delivery system") 420, and a publishing system datastore 422.

The controller engine 402 may be configured to control functionality and/or interaction of some or all of the engines 404-420 and the publishing systems datastore 422. In some embodiments, the controller engine 402 manages the datastore 422. For example, the controller engine 402 may cache or buffer received streaming content (e.g., unmarked content item 114) in the datastore 422, read cached or buffered content from the datastore 422, update cached or buffered content in the datastore 422, delete cached or buffered content in the datastore 422, and so forth.

The consumer interface engine 404 may be configured to request and receive consumer profile information over a communications network to generate consumer profiles associated with consumer systems. For example, a consumer profile may be used to format unmarked content items for presentation by a corresponding consumer systems, format advertisements for presentation by a corresponding consumer system, select consumer system attributes for requesting advertisements, recommend unmarked content items, and the like. In some embodiments, the consumer interface engine 404 may comprises an implementation of the HTTP or HTTPS protocol.

The consumer profile manager 406 may be configured to manage (e.g., create, read, update, delete, or otherwise access) consumer profiles. For example, consumer profiles may be stored in the datastore 422. In some embodiments, consumer profiles may store computer hardware attributes, demographic attributes, geographic attributes, psychographic attributes, and the like. For example, consumer profiles may store some or all of the following information:

- Consumer Profile Identifier: identifies the consumer profile.
- OS: an operating system of an associated consumer system (e.g., Windows, MacOS, Linux, etc.).
- Network Connection: speed (e.g., 5 Mb/s) and/or type of connection (e.g., LAN, WAN, wireless, wired, etc.).
- Display: display attributes of an associated consumer system (e.g., screen size, screen resolution, etc.).
- Audio: audio attributes of an associated consumer system.
- Device Type: type of device of an associated consumer system (e.g., mobile device, laptop computer, desktop computer, etc.)
- Gender: gender of the consumer associated with the consumer profile.
- Name: name of the consumer associated with the consumer profile.
- Age: age of the consumer associated with the consumer profile.
- Geographic Location: a current location of the of the consumer associated with the consumer profile, e.g., as determined by a location service and/or specified by the consumer.
- Content Viewing History: a history of the content streamed by a consumer or associated system. For example, a list of streamed titles, timestamp information, and so forth.
- Advertisement Viewing History: a viewing history of advertisements. For example, a list of streamed advertisements, a list of advertisements that resulted in click-throughs or other related activity (e.g., viewing advertisement sponsor website), a list advertisements skipped or fast-forwarded, and the like.

The content provider interface engine 408 may be configured to request and receive unmarked content items over a communication network. In some embodiments, the content interface engine 408 comprises an implementation of the RTSP protocol.

The content manager engine 410 may be configured to manage (e.g., create, read, update, delete, or otherwise access) locally stored (e.g., streamed, cached, buffered, etc.) unmarked content items. For example, unmarked content items may be locally stored, at least temporarily, in the datastore 422. For example, unmarked content items may include some or all of the following information:

- Content Item Identifier: identifies the unmarked content item.
- Content: the stream-enabled data of the unmarked content item.
- Content Format: a media format of the unmarked content item (e.g., MPEG, MOV, AVI, etc.).
- Display Quality: display attributes of the unmarked content item (e.g., resolution, recommended screen size, color quality, audio quality, etc.)
- Video Content Time: the duration of video content included in the unmarked content item. For example, the running time of an episode of a show.
- Title: a title of the content (e.g., "Seinfeld, S1, Ep. 2").
- Genre: a genre of the unmarked content item (e.g., comedy, drama, action, etc.).

In some embodiments, the content manager 410 formats, or otherwise modifies, unmarked content items. For example, the content manager engine 410 may format an unmarked content item based on consumer profile attributes associated with a target computer system.

The advertisement provider interface engine 412 may be configured to request and receive advertisements over a communication network. In some embodiments, the advertisement provider interface engine 412 may comprises an implementation of the VAST protocol.

The advertisement manager engine 414 may be configured to manage (e.g., create, read, update, delete, or otherwise access) locally stored (e.g., streamed, cached, buffered, etc.) advertisements. For example, advertisements may be at least temporarily stored in the datastore 422. For example, advertisements may include some or all of the following information:

Advertisement Identifier: identifies the advertisement.

Advertisement: the stream-enabled data of the advertisement.

Advertisement Format: a media format of the advertisement (e.g., MPEG, MOV, AVI, etc.).

Display Quality: display attributes of the advertisement (e.g., resolution, recommended screen size, color quality, audio quality, etc.)

Advertisement Time: the duration of advertisement. For example, the running time of the advertisement.

Title: a title of the advertisement.

Genre: a genre of the advertisement (e.g., sports, home improvement, dining, shopping, etc.).

In some embodiments, the advertisement manager engine 414 formats, or otherwise modifies, advertisements. For example, the advertisement manager engine 414 may format an advertisement based on consumer profile attributes associated with a target computer system.

In some embodiments, the advertisement manager engine 414 selects consumer system attributes for receiving targeted advertisements. For example, advertisements may be selected by the advertisement provider system 102 based on one or more consumer profile attributes associated with a streaming target. In some embodiments, the consumer system attributes may be selected in real-time (e.g., while the associated unmarked content item is streaming to the target), and/or prior to streaming (or, "offline").

The program guide engine 416 may be configured to provide a guide of unmarked content items (or, a "content listing"). For example, the guide may be presented to a consumer system for selecting unmarked items. In some embodiments, the guide may comprise a graphical user interface (GUI) that may be displayed on a consumer system. In some embodiments, the program guide engine 416 provides content mappings (or, "mappings") to store unmarked content items. For example, the unmarked content items may be stored locally (e.g., in the datastore 422), and/or remotely (e.g., by the content provider system 104). The mappings may be used to retrieve unmarked content items for streaming to a consumer system 108. For example, a consumer system 108 may browse and select unmarked content items through the guide, and the selected unmarked content items may be retrieved based on the mappings.

In some embodiments, unmarked content items may be retrieved in segments which may improve streaming quality and/or performance. For example, a first segment may be retrieved based on the mappings (e.g., streamed from a content provider system 104 to the consumer system 108). At the end of the first segment, or within a proximity to an end of the first segment, e.g., to allow for buffering of subsequent segments, a second segment may be retrieved based on the mappings (e.g., streamed from the server system 106 to consumer system 108).

In some embodiments, the program guide engine 416 may be configured to generate mappings for segments of the same unmarked content item stored in different locations. For example, the mappings may indicate a first set of segments (e.g., segments including at least one insertion point) are stored on the server system 106, and a second set of segments (e.g., segments without any insertion points) are stored on the content provider system 104. The mappings may be stored, for example, in the server system database 422. In some embodiments, based on the mappings, the first set of segments may be streamed to the consumer system 108 from the server system 106, and the second set of segments may be streamed from the content provider system 104.

The content processing engine 418 may be configured to stitch advertisements in unmarked content items. In some embodiments, the content processing engine 418 modifies an unmarked content item to include the advertisement data in the data of the unmarked content item. For example, it may replace a set of sequential black frames with one or more advertisements. In other embodiments, the content processing engine 418 triggers streaming of one or more advertisements upon reaching a registered insertion point, without necessarily modifying the unmarked content item.

In some embodiments, the content processing engine 418 calculates a "true time" of unmarked content items. For example, an unmarked content item may include video content, and black frames indicating insertion points for advertisements. The duration of the video content, or "running time," may be 22 minutes, for example. The true time may be calculated based on the running time and the duration of any stitched advertisements. For example, if a segment of two advertisements totaling one minute is stitched at a first insertion point, and a segment of three advertisements totaling one minute and thirty seconds is stitched at a second insertion point, the true time may be twenty-four minutes and thirty seconds. The true time may be reflected in a status indicator (e.g., a scroll bar) presented to a consumer while viewing the streamed unmarked content item and/or advertisements.

In some embodiments, the true time may be calculated dynamically, and/or prior to initiating streaming of the unmarked content item. For example, if advertisements are received prior to streaming, the true time may similarly be calculated prior to streaming. Alternatively, if advertisements are received in real-time (e.g., during streaming of the unmarked content item), the duration of the advertisements may be unknown prior to streaming, and the true time may be calculated during streaming.

The content delivery engine 420 may be configured to provide unmarked content items and advertisements for playback by consumer systems. For example, the content delivery engine 420 may stream unmarked content items and advertisements over a communication network. As discussed above, in various embodiments, unmarked content items may be streamed in segments, which may improve streaming quality and/or performance. For example, a first segment may be streamed, and at the end of the first segment, or within a proximity to an end of the first segment, e.g., to allow for buffering of subsequent segments, a second segment may be streamed.

Figure 5:
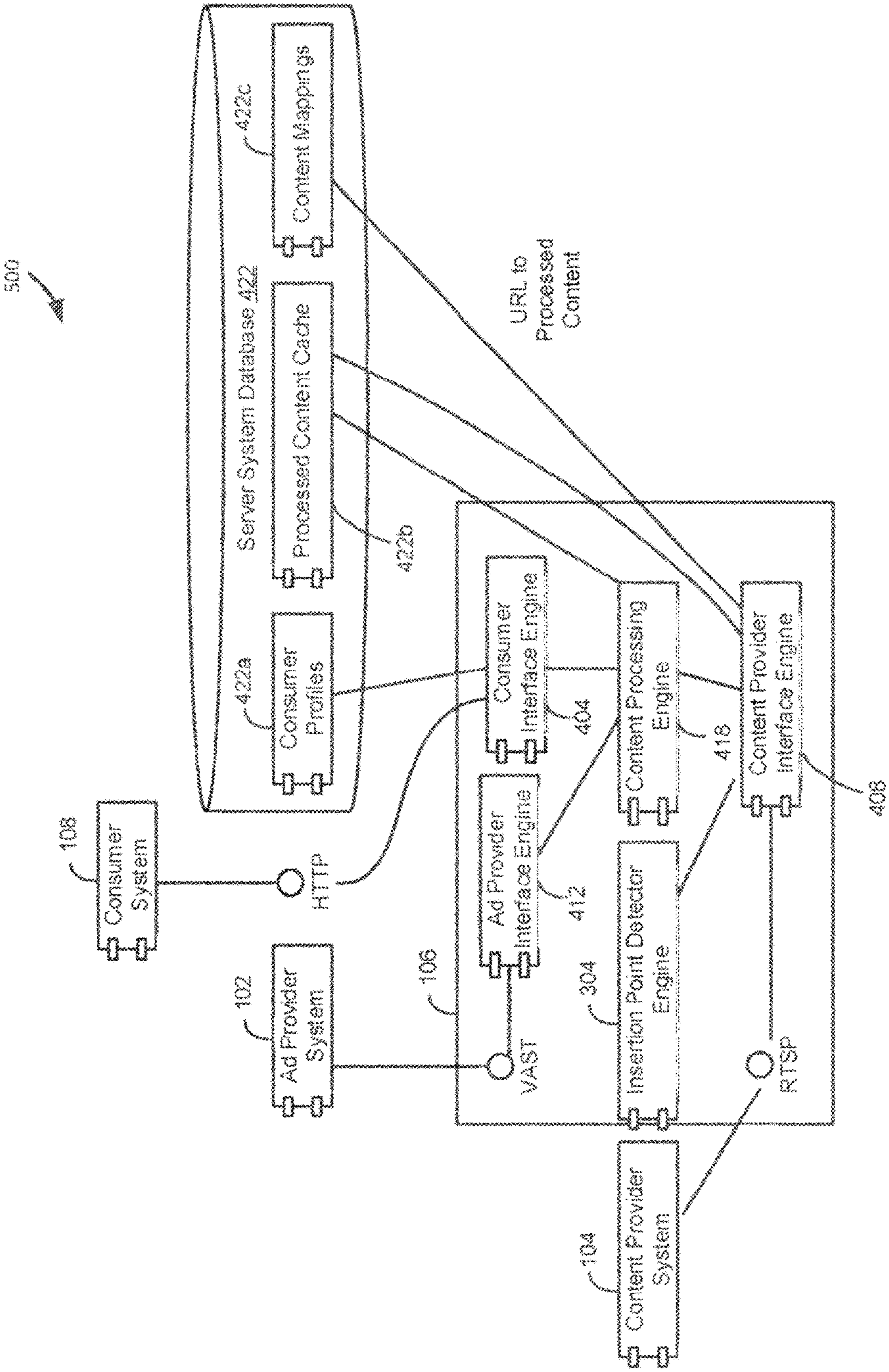
FIG. 5 depicts a block diagram illustrating details of a content delivery network system according to some embodiments.

FIG. 5 depicts a block diagram 500 illustrating details of a content delivery network system 100 according to some embodiments. As shown, a server system database 422 stores consumer profiles 422*a*, a processed content cache 422*b*, and content mappings 422*c*. A consumer system 108 provides an HTTP request for an unmarked item to a consumer interface engine 404. The consumer interface engine 404 retrieves a corresponding profile from the server system database 422. The content provider interface engine 408 retrieves the requested unmarked content item from a content provider system 104 using an RTSP protocol. An insertion point detector engine 304 processes the unmarked content item to detect and register one or more insertion points. The processed unmarked content item is stored in the processed content cache 422. A content processing engine 418 selects one or more advertisements based on the corresponding profile, and an advertisement provider interface engine 412 retrieves the selected advertisements from an advertisement provider system 102 using a VAST protocol. The server system 106 may stream the processed unmarked content item to the consumer system 108 in segments based on the content mappings 422*c*.

Figure 6:
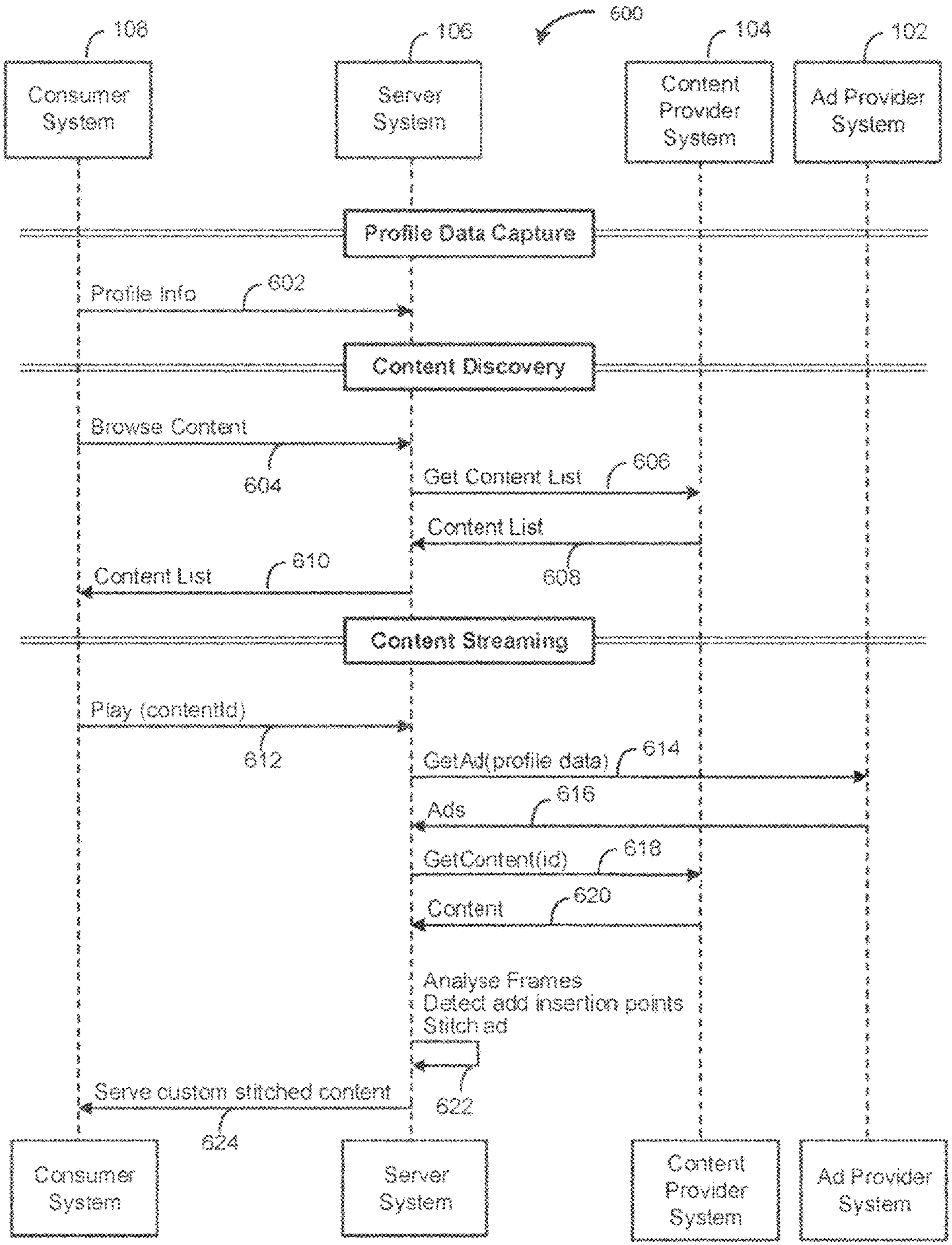
FIG. 6 depicts a flowchart illustrating a method of stitching one or more advertisement in streaming content according to some embodiments.

FIG. 6 depicts a flowchart 600 illustrating a method of stitching one or more advertisements in streaming content (e.g., an unmarked content item 114) according to some embodiments. In this and other flowcharts, the flowchart shows by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 602, a consumer system 108 provides consumer profile information to a server system 106. For example, the server system 106 may obtain the information in response to an account registration request. In some embodiments, the client system 122 of the consumer system 108 transmits the consumer profile information over a communication network 110, and a consumer interface engine 404 of the server system 106 receives the consumer profile information over the communication network 110. Profile information can be obtained from other means, e.g., from social networks, from monitoring user content choices, from content providers (e.g., Netflix), from search companies (e.g., Google), etc.

In step 604, the consumer system 108 transmits a request for a content list to the server system 106. In some embodiments, a program guide engine 416 of the server system 106 receives the request.

In step 606, the server system 106 transmits a request for the content list to a content provider system 104. In some embodiments, a content provider interface engine 408 transmits the request.

In step 608, the content system 104 transmits the content list to the server system 106. In some embodiments, the content provider interface engine 408 of the server system 106 receives the content list.

In step 610, the server system 106 transmits the content list to the content provider system 104. The content provider system 104 presents the content list to a consumer. In some embodiments, a client system 122 receives and displays the content list.

In step 612, the consumer system 108 transmits a request for playback of a selected unmarked content item. In some embodiments, a client system 122 submits the request.

In step 614, the server system 106 transmits a request to the advertisement provider system 102 for one or more advertisements to stitch into the unmarked content item. In some embodiments, the advertisement provider interface engine 412 issues the request. In some embodiments, the request is based on one or more attributes of the consumer system 108.

In step 616, the advertisement provider system 102 provides the one or more advertisements to the server system 106. In some embodiments, the advertisement interface engine 412 receives the one or more advertisements.

In step 618, the server system 106 transmits a request to the content provider system 104 for the selected unmarked content item. In some embodiments, a content provider interface engine 408 issues the request.

In step 620, the content provider system 104 provides the selected unmarked content item to the server system 106. In some embodiments, the content provider system 104 downloads the unmarked content item, and the content provider interface engine 408 receives the download. In some embodiments, the content provider system 104 provides the entire content. In some embodiments, the content provider system 104 provides only the content that has not been previously downloaded to the server system 106. In some embodiments, the content provider system 104 provides the content in segments.

In step 622, the server system 106 process the unmarked content item and automatically identifies one or more insertion points. In some embodiments, the content processing engine 418 performs the identification. The server system 106 further stitches the one or more advertisements in the detected insertion points. In some embodiments, the content processing engine 418 performs the stitching.

In step 624, the server system 106 transmits the stitched content to the consumer system 108. In some embodiments, the server system 106 may insert the advertisement into the content at the insertion point and stream the stitched content. In some embodiments, the server system 106 may stream the unmarked content item to the consumer system 108 until an insertion point is reached. Once an insertion point is reached, the server system 106 may stream of the unmarked content item may be paused, and the server system 106 may stream the one or more advertisements. After completing the advertisements, the server system 106 may resume streaming the unmarked content item. The server system 106 may repeat for each insertion point. In some embodiments, the content delivery engine 420 of the server system 106 provides the stitched content.

Figure 7:
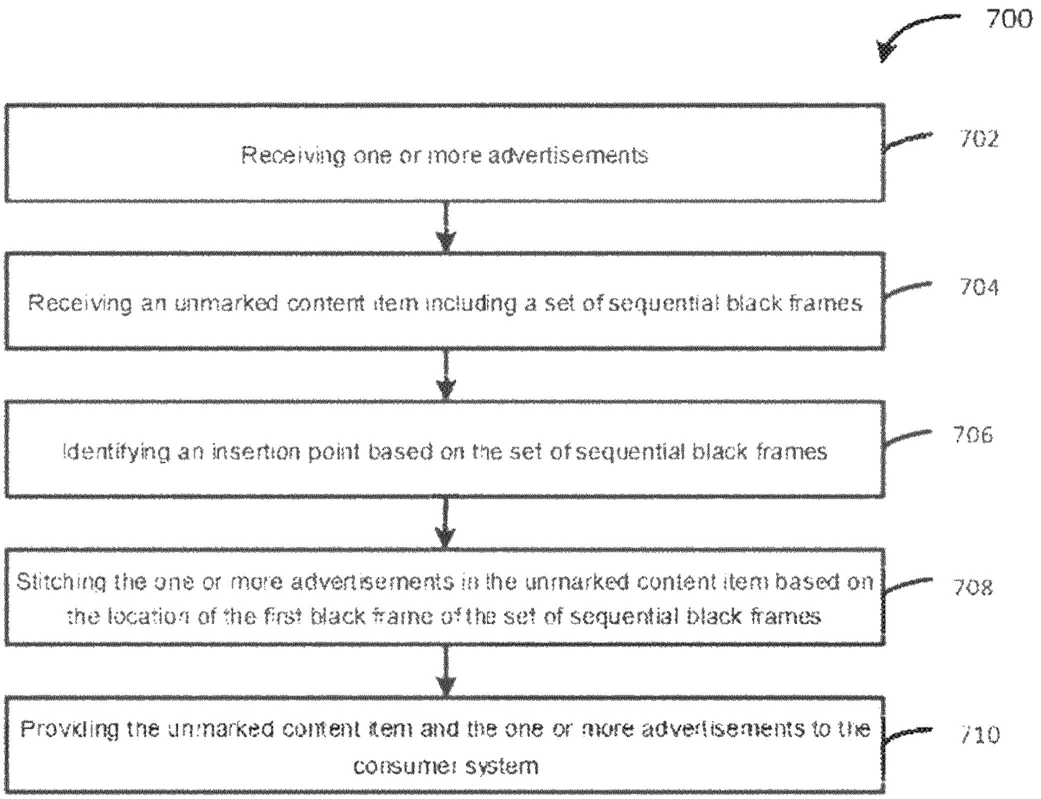
FIG. 7 depicts a flowchart illustrating a method of operation of a server system for stitching one or more advertisements in streaming content according to some embodiments.

FIG. 7 depicts a flowchart 700 illustrating a method of operation of a server system 106 for stitching one or more advertisements in streaming content according to some embodiments.

In step 702, an advertisement interface engine 404 receives one or more advertisements 112, and a controller engine 402 stores them at least temporarily (e.g., cached or buffered) in a server system datastore 422.

In step 704, a content interface engine 408 receives the unmarked content item 114, and the controller engine 402 stores it at least temporarily (e.g., cached or buffered) in the server system datastore 422. The unmarked content item may comprise a stream-enabled video including a set of one or more sequential black frames.

In step 706, an insertion point detector engine 304 identifies an insertion point based on a location of at least one black frame of the set of sequential black frames. In some embodiments, the insertion point is ahead of a current playback point of the unmarked content item 114 streaming to the consumer system.

In step 708, a content processing engine 418 stitches one or more advertisements in the unmarked content item at the insertion point. In some embodiments, the content processing engine 418 may add the one or more advertisements to the unmarked content, e.g., by replacing the black frames with the frames of the one or more advertisements. In other embodiments, the content processing engine 418 does not modify the unmarked content item, and instructs a content delivery engine 422 to stream the one or more advertisements after pausing the content playback upon reaching the insertion point.

In step 710, the content delivery system 422 streams the unmarked content item 114 to the consumer system 108 until the insertion point is reached, and streams the one or more advertisements to the consumer system 108 when the insertion point is reached.

Figure 8:
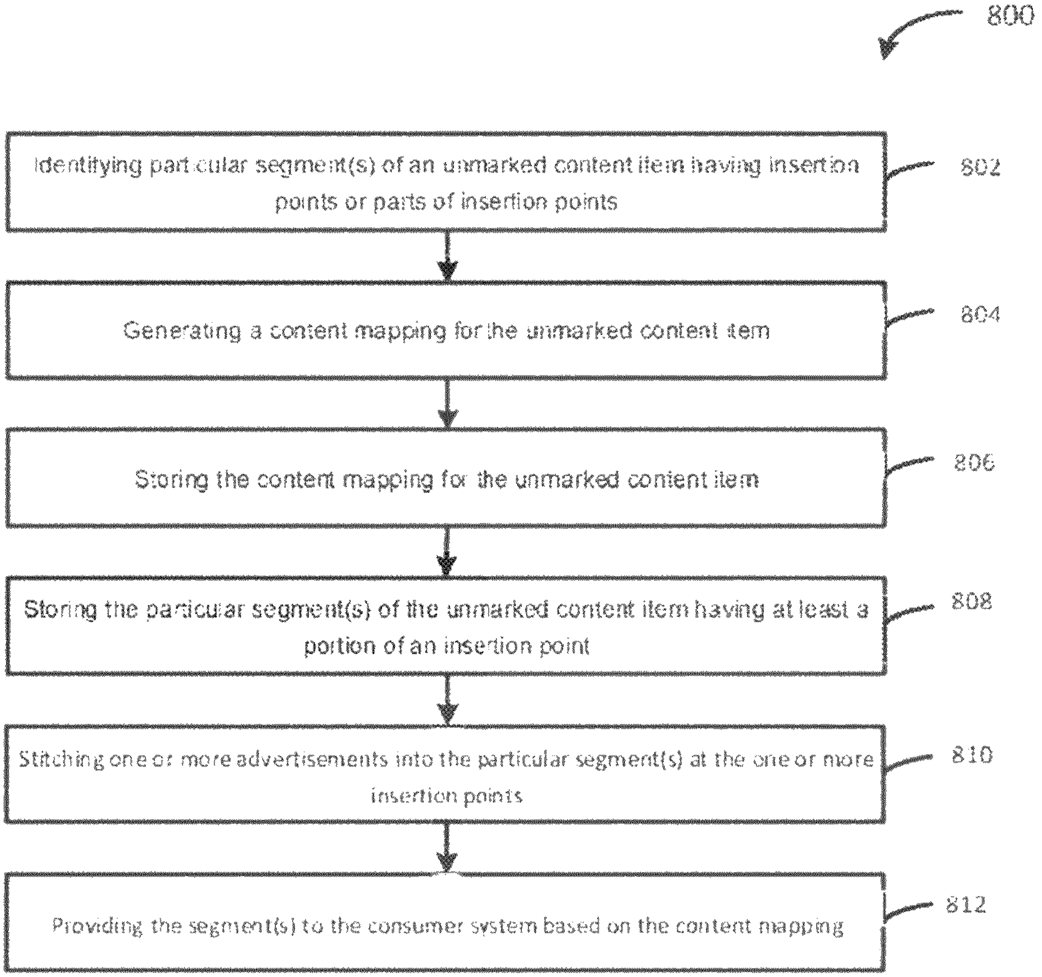
FIG. 8 depicts a flowchart illustrating a method of operation of a server system for stitching one or more advertisements in segments of streaming content according to some embodiments.

FIG. 8 depicts a flowchart 800 illustrating a method of operation of a server system 106 for stitching one or more advertisements in particular segments of streaming content according to some embodiments. As discussed above, unmarked content items may be streamed in segments. In some embodiments, particular segments of an unmarked content item may be streamed by the server system 106, and the remaining segments of the unmarked content item may be provided by a remote system (e.g., a content provider system 104). This may help to reduce a load on the server system 106 by requiring the server system 106 only to process and/or stream particular segments (e.g., segments with insertion points) of unmarked content items.

In step 802, a content processing engine 418 identifies segments of an unmarked content item. For example, an unmarked content item for a 22-minute episode of a show may have 25 segments. In some embodiments, one or more particular segments of the unmarked content item includes at least one insertion point (e.g., identified by a set of one or more sequential black frames), and the remaining segments include only video content without any insertion points. For example, the first two segments may not have any insertion points, the third segment may include an insertion point, and so forth.

In some embodiments, an insertion point may be wholly included in a single segment, or be spread across a plurality of segments. For example, a set of sequential black frames may be included within a particular segment or between two segments (e.g., between segments three and four).

In some embodiments, the server system 106 identifies offline segments with insertion points, e.g., as part of a batch identification process. For example, a content provider system 104 may maintain a library of unmarked content items. Accordingly, in some embodiments, the server system 106 may identify segments having insertion points prior to a consumer system 108 requesting a stream of a selected unmarked content item.

In step 804, a program guide engine 416 generates a content mapping for the unmarked content item. In some embodiments, the content mapping comprises a table or other structure indicating a location of each segment of the unmarked content item from which the player is to obtain the segment. For example, segments without insertion points may be stored on the content provider system 104 and retrieved by the player using URLs identifying the locations on the content provider system 104, and the segments having insertion points may be stored on server system 106 and retrieved by the player using URLs identifying the locations on the server system 106.

In step 806, a controller engine 402 stores the content mapping in a server system datastore 422. In various embodiments, some or all of the content map may be provided to the consumer system 108 to facilitate selection and playback of the unmarked content item. For example, after selecting an unmarked content item for streaming, the server system 106 may provide the URLs for each segment of the unmarked content item to the consumer system 108. The consumer system 108 may then playback the unmarked content item by sequentially navigating to the individual URLs.

In step 808, the content manager engine 410 stores the particular segments of the unmarked content item having at least a portion of an insertion point. For example, for an unmarked content item comprising 25 segments, in which segments 1-3, 5-9, 12-18, 20-21, and 25 do not include at least a portion of an insertion point, and segments 4, 10, 11, 19, and 22-24 each include at least a portion of an insertion point, the server system 106 may store segments 4, 10, 11, 19, and 22-24.

In step 810, the content processing engine 418 stitches one or more advertisements in the particular segments at the one or more insertion points. Continuing the example above, the server system 106 may stitch advertisements in segments 4, 10, 11, 19, and 22-24 of the 25-segment unmarked content item. In some embodiments, the server system 106 may append the one or more advertisements within the particular segments, e.g., by replacing the black frames with the frames of the one or more advertisements. In other embodiments, the server system 106 does not modify the particular segments, and streams the one or more advertisements after pausing the content playback upon reaching an insertion point. Accordingly, it will be appreciated that, in some embodiments, "stitched content" may include content items that have not necessarily been modified, or content items that have been modified.

In step 812, the content provider system 104 provides the segments without the insertion points and the server system 106 provides the stitched segments to the consumer system 108. Continuing the example above, the content provider system 104 may stream its segments 1-3, 5-9, 12-18, 20-21, and 25 to the consumer system 108. The server system 106 may stream segments 4, 10, 11, 10 and 22-24 to the consumer system 108. The server system 106 may provide the advertisements at the determined delivery time during playback of its particular segments. In some embodiments, the content delivery processing engine 420 provides the stitched segments.

Figure 9:
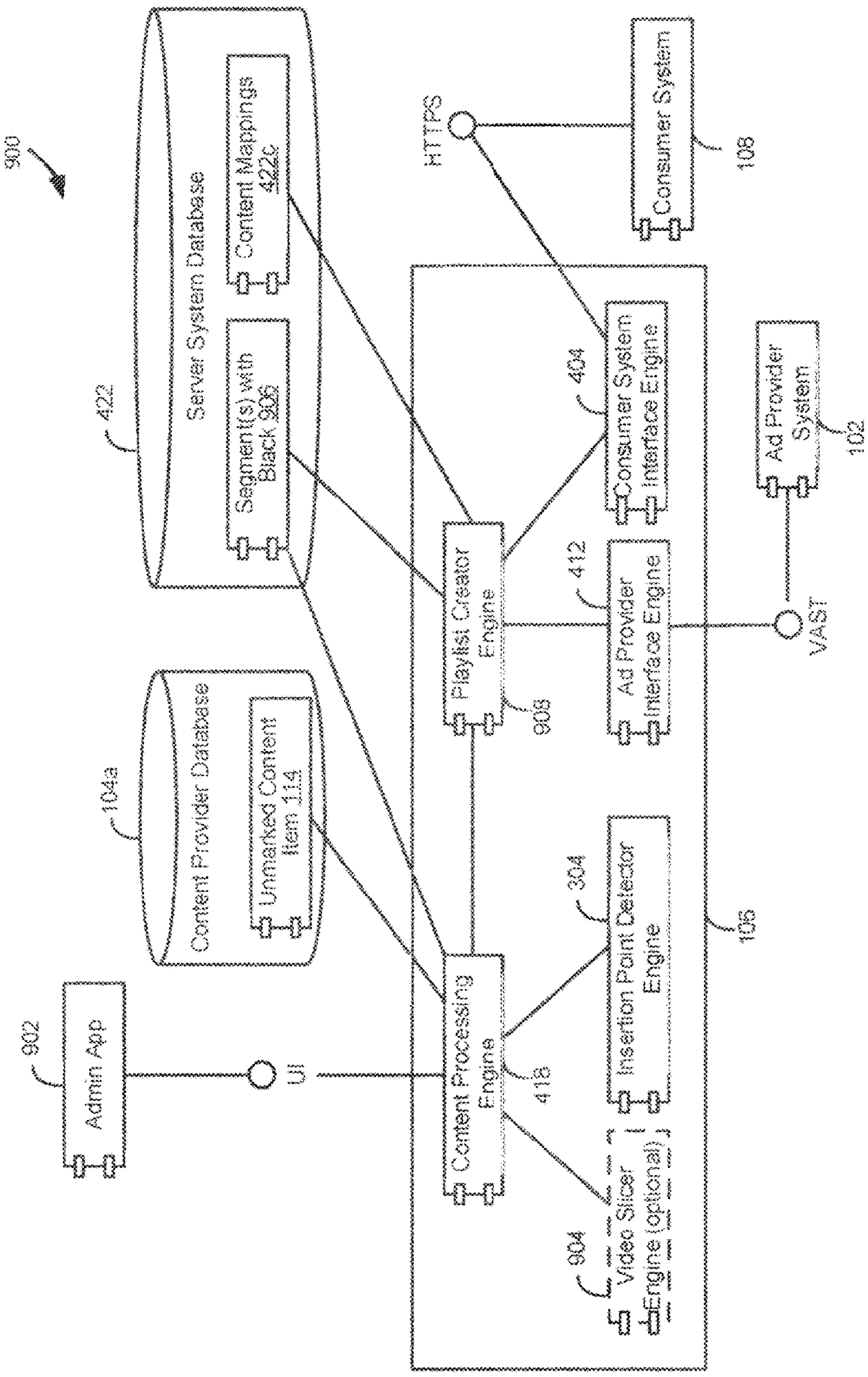
FIG. 9 depicts a block diagram illustrating details of a content delivery network system according to some embodiments.

FIG. 9 depicts a block diagram 900 illustrating details of a content delivery network system 100 according to some embodiments. As shown, the content provider database 104*a* stores an unmarked content item 114. The insertion point detector engine 304 detects one or more insertion points in the unmarked content item 114 (e.g., as indicated by a set of sequential black frames). The admin app 902 may verify the insertion points and/or modify the insertion points. For example, the admin app 902 may replace sequential insertion points with a single insertion point. The optional video slicer engine 904 may slice the unmarked content item 114 based on segments with at least one insertion point, and segments without any insertion points. In some embodiments, the unmarked content item 114 may be pre-sliced (e.g., by the content provider system 104). The server system database 422 stores the slices (or, "segments") 906 having at least one insertion point, and generates a mapping 422*c* stored in the server system database 422. For example, the mapping 422*c* may comprise an M3U8 format. The mapping 422*c* may include locations for each segment of the unmarked content item 114. The consumer system 108 requests the unmarked content item 114 (or, "video") from the server system 106 via the consumer interface engine 404, e.g., using the HTTPS protocol. The playlist creator 908 generates a playlist including segments with insertion points and segments without insertion points, based on the content mappings 422*c* stored in the server system datastore 422.

The advertisement provider interface engine 412 collects advertisements 112 using a VAST protocol from an advertisement server 102. The playlist may be provided to the consumer system 108 through the consumer interface engine 404, and the consumer system 108 may execute the playlist, or portions of the playlist, to stream segments 906 with advertisements from the server system 106, and segments 114 without any advertisements from the content provider database 104*a*. The content processing engine 418 may stitch the advertisements during streaming of one or more segments to the consumer system 108.

Figure 10:
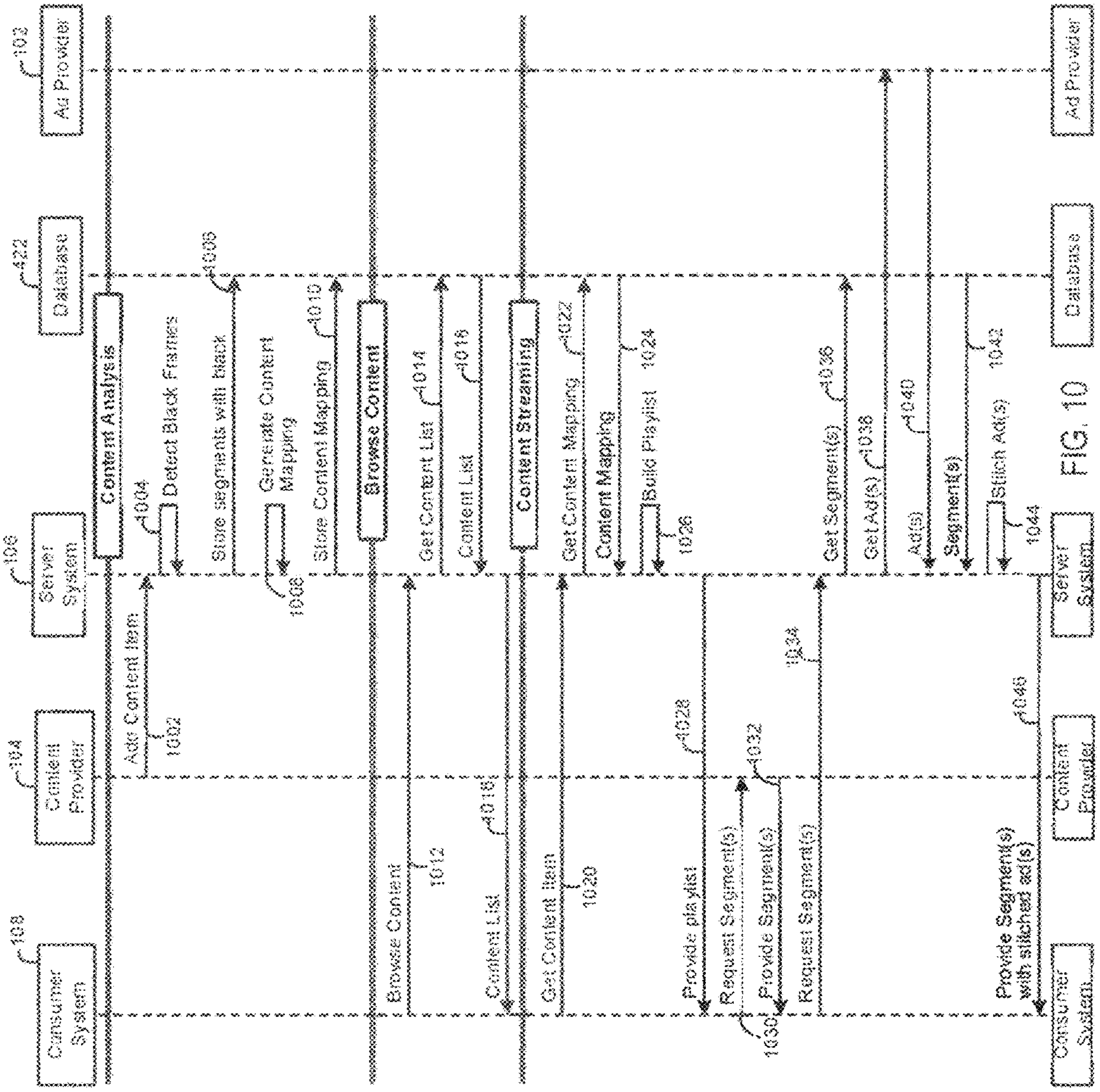
FIG. 10 depicts a flowchart illustrating a method of stitching one or more advertisements in streaming content according to some embodiments.

FIG. 10 depicts a flowchart 1000 illustrating a method of stitching one or more advertisements in streaming content according to some embodiments.

In step 1002, a content provider system 104 provides an unmarked content item to a server system 106. In some embodiments, a content provider interface engine 404 of the server system 106 receives the unmarked content item, and a content manager engine 410 stores the unmarked content item at least temporarily (e.g., cached) in a server system datastore 422.

In step 1004, the server system 106 detects at least one insertion point in the unmarked content item. In some embodiments, an insertion point detector engine 304 detects the insertion points based on one or more sets of sequential black frames.

In step 1006, the server system 106 stores the segments with insertion points in a database 422. In step 108, the server system 106 generates a content mapping indicating a location for each segment. For example, the content mapping may comprises a set of URLs pointing to the server system 106 for segments with an insertion point, and pointing to the content provider system 104 for segments without any insertion points. In some embodiments, a program guide engine 416 generates the content mapping.

In step 1010, the server system 106 stores the content mapping in the server system datastore 422. In some embodiments, a controller engine 402 stores the content mapping in the server system datastore 422.

In step 1012, a consumer system 108 provides a request to the server system 106 to browse unmarked content items, e.g., a list, or other structure, of unmarked content items. In some embodiments, the consumer interface engine 404 of the server system 106 receives the request from the consumer system 108.

In step 1014, the server system 106 provides a request to the database 422 for a list of unmarked content items. In step 1016, the database 422 provides the list to the server system 106. In step 1018, the server system 106 provides the list to the consumer system 108. In some embodiments, a content manager engine 410 provides the request for the list and receives the request for the list, and the consumer interface engine 404 provides the list to the consumer system 108.

In step 1020, the consumer system 108 provides a request to the server system 106 to stream an unmarked content item. In some embodiments, the consumer interface engine 404 receives the request.

In step 1022, the server system 106 provides a request to the database 422 for a content mapping corresponding to the unmarked content item. In some embodiments, the content manager engine 410 provides the request.

In step 1024 the database 422 provides the content mapping to the server system 108. In step 1026, the server system 106 generates a playlist based on the content mapping and advertisements. In some embodiments, the program guide engine 416 generates the playlist. In other embodiments, a playlist creator engine 908 generates the playlist.

In step 1028, the server system 106 provides the playlist to the consumer system 108. In some embodiments, the consumer interface engine 404 provides the playlist.

In step 1030, the consumer system 108 provides a request to the content provider system 104 for one or more segments without any insertion points. The request may be based on the playlist. For example, the request may comprise a URL pointing to a location of the content provider system 104. In step 1032, the content provider system 104 provides the requested segments to the consumer system 108, and the consumer system 108 renders the segments.

In step 1034, the consumer system 108 provides a request to the server system 106 for one or more segments each having at least one insertion point. The request may be based on the playlist. For example, the request may comprise a URL pointing to a location of the server system 106. In step 1036, the server system 106 provides the request to the database 422.

In step 1038, the server system 106 provides a request for one or more advertisements to the advertisement server 102. In some embodiments, an advertisement provider interface engine 412 provides the request. In step 1040, the advertisement server 102 provides the advertisements to the server 106. In some embodiments, the advertisement provider interface engine 412 receives the advertisements.

In some embodiments, the server system 106 requests advertisements prior to requesting segments (e.g., in step 1034). For example, the server system 106 may cache advertisements received from the advertisement provider system 102 prior to content streaming.

In step 1042, the database 422 provides segments with insertion points to the server system 106. In step 1044, the server system 106 stitches the advertisements in the unmarked content item. In some embodiments, the content processing engine 418 stitches the advertisements.

In step 1046, the server system 106 provides the requested segments with the stitched advertisements to the consumer system 108, and the consumer system 108 renders the segments. Steps 1030-1046 may be repeated, in various orders, until streaming of the unmarked content item is terminated (e.g., upon reaching an end of the unmarked content item, in response to consumer input, and so forth).

Figure 11:
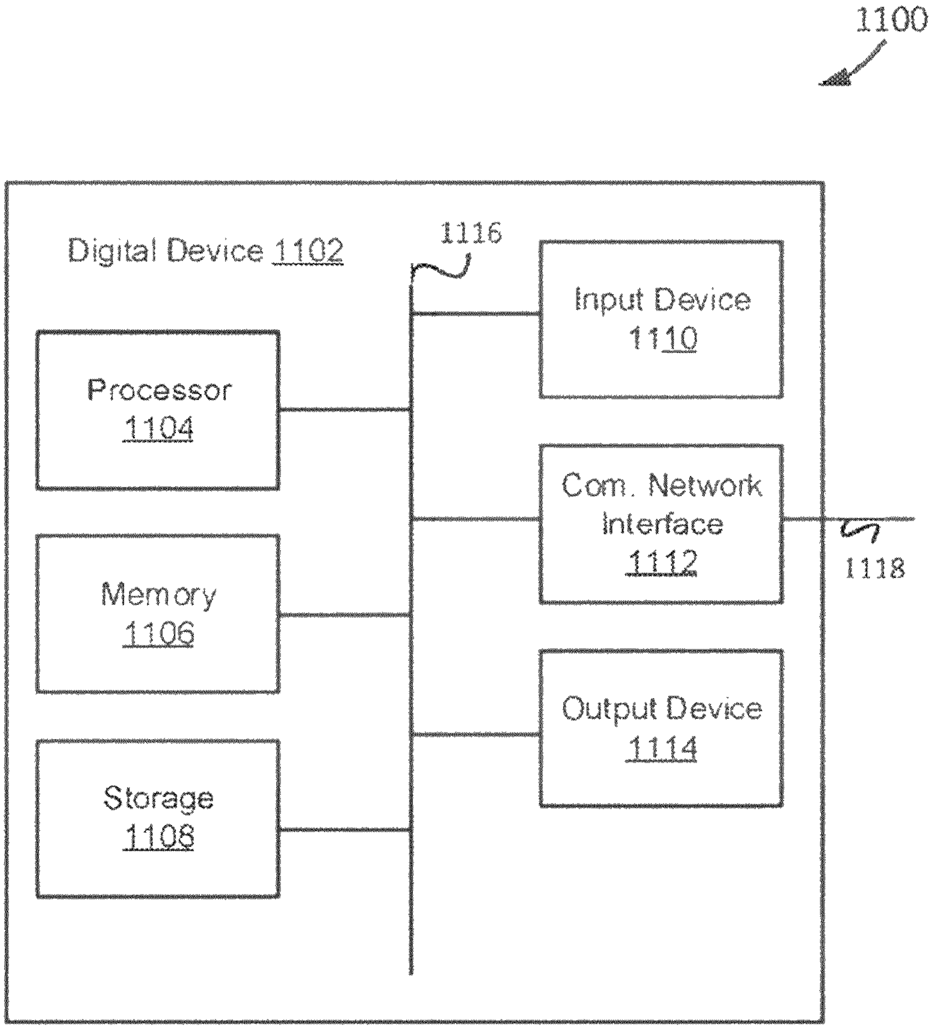
FIG. 11 depicts a block diagram illustrating details of a computing device according to some embodiments.

FIG. 11 depicts a block diagram 1100 illustrating details of a computing device 1102 according to some embodiments. Any of the advertisement provider system 102, the content provider system 104, the server system 106, the consumer system 108, and the communication network 110 may comprise an instance of the digital device 1102. The digital device 1102 comprises a processor 1104, memory 1106, storage 1108, an input device 1110, a communication network interface 1112, and an output device 1114 communicatively coupled to a communication channel 1116. The processor 1104 is configured to execute executable instructions (e.g., programs). In some embodiments, the processor 1104 comprises circuitry or any processor capable of processing the executable instructions.

The memory 1106 stores data. Some examples of memory 1106 include storage devices, such as RAM, ROM, RAM cache, virtual memory, etc. In various embodiments, working data is stored within the memory 1106. The data within the memory 1106 may be cleared or ultimately transferred to the storage 1108.

The storage 1108 includes any storage configured to retrieve and store data. Some examples of the storage 1108 include flash drives, hard drives, optical drives, and/or magnetic tape. Each of the memory system 1106 and the storage system 1108 comprises a computer-readable medium, which stores instructions or programs executable by processor 1104.

The input device 1110 is any device that inputs data (e.g., mouse and keyboard). The output device 1114 outputs data (e.g., a speaker or display). It will be appreciated that the storage 1108, input device 1110, and output device 1114 may be optional. For example, the routers/switchers may comprise the processor 1104 and memory 1106 as well as a device to receive and output data (e.g., the communication network interface 1112 and/or the output device 1114).

The communication network interface 1112 may be coupled to a network (e.g., network 110) via the link 1118. The communication network interface 1112 may support communication over an Ethernet connection, a serial connection, a parallel connection, and/or an ATA connection. The communication network interface 1112 may also support wireless communication (e.g., 1102.11 a/b/g/n, WiMax, LTE, WiFi). It will be apparent that the communication network interface 1112 may support many wired and wireless standards.

It will be appreciated that the hardware elements of the digital device 1102 are not limited to those depicted in FIG. 11. A digital device 1102 may comprise more or less hardware, software and/or firmware components than those depicted (e.g., drivers, operating systems, touch screens, biometric analyzers, or the like). Further, hardware elements may share functionality and still be within various embodiments described herein. In one example, encoding and/or decoding may be performed by the processor 1104 and/or a co-processor located on a GPU (i.e., NVidia).

It will be appreciated that a "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

Figure 12:
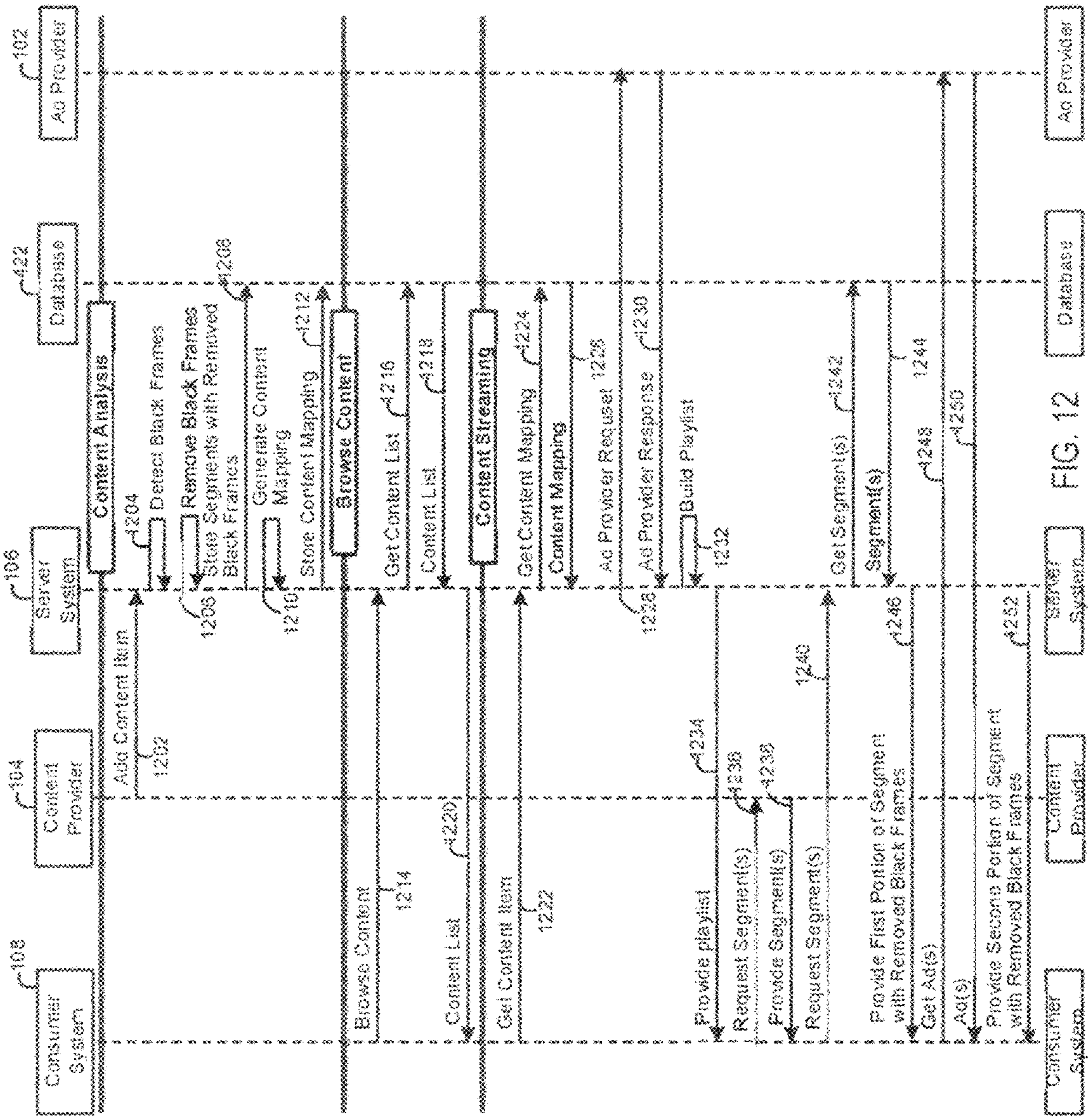
FIG. 12 depicts a flowchart illustrating a method of dynamically stitching one or more advertisements according to some embodiments.

FIG. 12 depicts a flowchart illustrating a method of dynamically stitching one or more advertisements according to some embodiments.

In step 1202, a content provider system 104 provides an unmarked content item to a server system 106. In some embodiments, a content provider interface engine 404 receives the unmarked content item, and a content manager engine 410 stores the unmarked content item at least temporarily (e.g., cached) in a server system datastore 422.

In step 1204, the server system 106 detects at least one insertion point in the unmarked content item. In various embodiments, an insertion point detector engine 304 detects the at least one insertion point based on one or more sets of sequential black frames.

In some embodiments, each segment of the unmarked content item having one or more sets of sequential black frames may be logically divided into one or more portions of content based on the one or more sets of sequential black frames. For example, a first portion of a segment may comprise the portion of content from a start portion (e.g., a first frame of the segment) up until the first set of sequential black frames, and a second portion of the segment may comprise the portion of content subsequent to the first set of black frames up until an end portion (e.g., a final frame of the segment) or a second set of sequential black frames. A segment may have any number of sets of sequential black frames, and each set of sequential black frames may be associated with a respective first portion and a respective second portion.

In step 1206, the server system 106 removes the one or more sets of sequential black frames from the segments of the unmarked content item including the at least one insertion point. For example, the server system 106 can modify a particular segment to remove a particular set of sequential black frames such that the portions of content surrounding a corresponding insertion point become continuous, without any intervening frames (e.g., black frames, empty frames, and the like) between the continuous portions of content. In some embodiments, the server system 106 replaces the removed one or more sets of sequential black frames with one or more tags or metadata indicating the at least one insertion point.

In step 1208, the server system 106 stores the segments having insertion points (e.g., the modified segments that have had the set(s) of sequential black frames removed). In some embodiments, the server system 106 stores the segments with insertion points in the database 422.

In step 1210, the server system 106 generates a content mapping indicating a location (e.g., a streaming source location) for each segment. For example, the content mapping may comprise a first set of URIs (e.g., URLs) pointing to the server system 106 for segments with an insertion point, and a second set of URIs pointing to the content provider system 104 for segments without any insertion points. In some embodiments, the content mapping indicates one or more advertisement provider systems 102 selected to provide advertisements in association with streaming segments including an insertion point. For example, the content mapping may comprise a third set of URIs pointing to the advertisement provider system 102. In some embodiments, a program guide engine 416 generates the content mapping.

In step 1212, the server system 106 stores the content mapping. In some embodiments, a controller engine 402 stores the content mapping in the database 422.

In step 1214, a consumer system 108 provides a request to the server system 106 to browse unmarked content items, e.g., a list, or other structure, of unmarked content items. In some embodiments, the consumer interface engine 404 receives the request from the consumer system 108.

In step 1216, the server system 106 provides a request to the database 422 for a list, or other suitable structure, of unmarked content items. In step 1218, the database 422 provides the list to the server system 106. In step 1220, the server system 106 provides the list to the consumer system 108. In some embodiments, a content manager engine 410 provides the request for the list and receives the request for the list, and the consumer interface engine 404 provides the list to the consumer system 108. Although a list is described here, other structures may be used instead of, or in addition to, a list.

In step 1222, the consumer system 108 provides a request to the server system 106 to stream an unmarked content item. In some embodiments, the consumer interface engine 404 receives the request.

In step 1224, the server system 106 provides a request to the database 422 for a content mapping corresponding to the unmarked content item. In some embodiments, the content manager engine 410 provides the request. In step 1226 the database 422 provides the content mapping to the server system 108.

In step 1228, the server system 106 provides an advertisement provider request to an advertisement provider system 102. For example, the advertisement provider request may comprise a VAST request. The advertisement provider request may comprise a request for a location (e.g., a URL or other URI) of the advertisement provider system 102 and/or one or more stream-enabled advertisements associated therewith. In some embodiments, an advertisement provider interface engine 422 provides the advertisement provider request.

In step 1230, the advertisement provider system 102 provides an advertisement provider response to the server system 106 based on the advertisement provider request. For example, the advertisement provider response may comprise a VAST response. The advertisement provider response may comprise the location of the requested advertisement provider system 102 and/or one or more stream-enabled advertisements associated therewith. In some embodiments, the advertisement provider interface engine 412 receives the advertisement provider response.

In step 1232, the server system 106 generates or updates a playlist based on the content mapping and the advertisement provider response. In some embodiments, the playlist may comprise locations from which segments of the unmarked content item and one or more advertisements may be streamed. For example, the playlist may include locations pointing to the server system 106 for segments including an insertion point, locations pointing to the content provider system 104 for segments without an insertion point, and locations pointing to the advertisement provider system 102 for advertisements to be streamed in connection with playback of corresponding segments of the unmarked content item when an insertion point is reached. In some embodiments, the program guide engine 416 generates the playlist. In other embodiments, a playlist creator engine 908 generates the playlist.

In step 1234, the server system 106 provides the playlist to the consumer system 108. In some embodiments, the consumer interface engine 404 provides the playlist.

In step 1236, the consumer system 108 provides a request to the content provider system 104 for one or more segments without any insertion points based on the playlist. For example, the request may comprise a URL pointing to a location of the content provider system 104. In step 1238, the content provider system 104 provides the requested one or more segments to the consumer system 108, and the consumer system 108 renders the one or more segments.

In step 1240, the consumer system 108 provides a request to the server system 106 for one or more segments each having at least one insertion point. The request may be based on the playlist. For example, the request may comprise a URL pointing to a location of the server system 106. In step 1242, the server system 106 provides the request to the database 422. In step 1244, the database 422 provides the requested one or more segments having at least one insertion points to the server system 106.

In step 1246, the server system 106 provides a first portion of a particular segment of the one or more segments having at least one insertion point to the consumer system 108, and the consumer system 108 renders the first portion of the particular segment. For example, the server system 106 may select and provide the first portion based on the playlist. In some embodiments, the consumer interface engine 408 provides the first portion of the particular segment to the consumer system 108.

In step 1248, the consumer system 106 provides a request for one or more advertisements to the advertisement server 102 based on the playlist. For example, the request may comprise a location of one or more stream-enabled advertisements to be streamed after completion of the first portion of the segment with removed black frames.

In step 1250, the advertisement provider system 102 provides the one or more advertisements to the consumer system 108 in response to the request for the one or more advertisements, and the consumer system 108 renders the one or more advertisements. In some embodiments, the one or more advertisements are provided directly from the advertisement provider system 102 to the consumer system 108 (e.g., without requiring routing, or other assistance, from the server system 106).

In step 1252, the server system 106 provides a second portion of the particular segment of the one or more segments having at least one insertion point to the consumer system 108, and the consumer system 108 renders the second portion of the particular segment. For example, the server system 106 may select and provide the second portion based on the playlist. In some embodiments, the consumer interface engine 408 provides the second portion of the particular segment to the consumer system 108.

Some or all of the steps 1236-1252 may be repeated, in various orders, until streaming of the unmarked content item is terminated (e.g., upon reaching an end of the unmarked content item and/or playlist, in response to consumer input, and so forth).

Although the method 1200 describes streaming to the consumer system 108 from the content provider system 104, the server system 106, and the advertisement provider system 108, it will be appreciated that various embodiments can include systems and methods providing one or more other streaming sources instead of, or in addition to, the content provider system 104, the server system 106, and the advertisement provider system 108. For example, the other streaming sources can include a metadata streaming source, additional content provider and/or content browsing sources (e.g., Uplynk), and the like. Accordingly, it will be appreciated that various embodiments can include any number of streaming sources, and the consumer system 102 may receive streams from any number of streaming sources.

Figure 13:
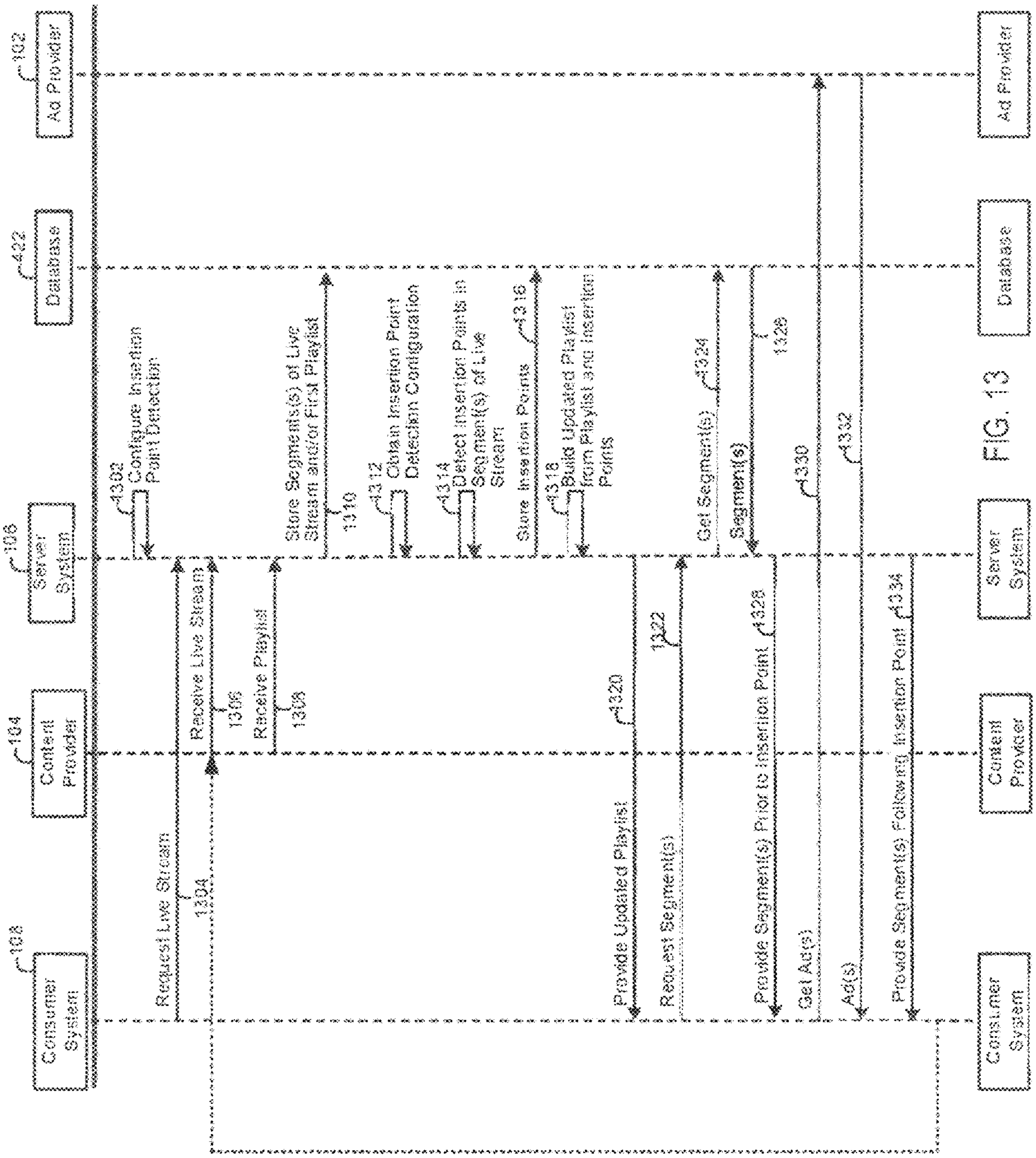
FIG. 13 depicts a flowchart illustrating a method of dynamically stitching one or more advertisements in a live stream of a content item according to some embodiments.

FIG. 13 depicts a flowchart 1300 illustrating a method of stitching one or more advertisements in a live stream of a content item according to some embodiments. As used herein, a live stream of a content item may include a live stream of prerecorded content (e.g., VOD content) and/or a live stream of a live event (e.g., live broadcast content). For example, a live stream of prerecorded content may include a live stream of a TV episode (e.g., an episode of Game of Thrones), and a live stream of a live event may include a live stream a live sporting event (e.g., a basketball game).

In step 1302, a server system 106 configures one or more types of insertion point detection (or, "cue point" detection). For example, a user (e.g., administrator) may configure new types of insertion point detection, and/or adjust existing types of insertion point detection. Any of the types of insertion point detection discussed herein may be created and/or adjusted (e.g., detecting black frames, detecting custom frames, detecting scene changes, detecting sound-level changes, and/or the like). The server system 106 may validate and/or store the insertion point detection configurations in database 422. For example, the server system 106 may validate that a configured type of insertion point detection conforms with a predetermined format.

In some embodiments, the types of insertion point detection may include an interrupt type. Interrupts may comprise manual detection and/or manual insertion of insertion points. An interrupt type may allow a user (e.g., administrator) to manually and/or in real-time define insertion points of a live stream of a content item. A user may manually insert insertion points before a live stream and/or during a live stream. For example, a user may manually insert insertion points during various points of a live event, such as during half-time of a sporting event, a time out of a sporting event, and/or the like. Manually inserted insertion points may be handled in the same manner as other insertion points described herein.

In step 1304, a consumer system 108 requests a live stream of a content item (or, simply, "live stream"). For example, a consumer may request a live stream before a start time of a live stream (e.g., 9 PM airing of Game of Thrones), at the start time of the live stream, or after the start time of the live stream. In some embodiments, the consumer may only have limited control of playback. For example, if a consumer requests a live stream at 9:15 PM for a live stream started at 9 PM, the consumer will not have access to the first 15 minutes of the live stream. In some embodiments, the consumer may also not be able to fast forward, rewind, and/or pause the live stream. In some embodiments, a client system (e.g., client system 122) requests the live stream.

In some embodiments, an admin application (e.g., admin application 902) cooperates with a content processing engine (e.g., content processing engine 418) and/or insertion point detector engine (e.g., insertion point detector engine 304) to configure the one or more types of insertion point detection. The types of insertion point detection (or, simply, "configurations") may be stored in the database 422.

In step 1306, the server system 106 receives the live stream from a content provider system 104. The live stream may include a plurality of stream-enabled segments (or, simply, "segments"), and/or sets of segments. For example, the server system 106 may receive a set of the segments (e.g., 3 stream-enabled segments) of a content item (e.g., an episode of Game of Thrones consisting of 25 stream enabled-segments), and additional set(s) of segments of the content item may be received later. In other examples, the server system 106 may receive all of the segments of a content item (e.g., all 25 segments of an episode of Game of Thrones). In some embodiments, the server system 106 may receive segments of a recorded portion of the live event. That is, in some embodiments, the server system 106 may receive a subset of the segments of the set of segments that will comprise the broadcast of the live event. In some embodiments, the server system 106 may buffer a predetermined amount of the live stream (e.g., 30 seconds of the live stream) sufficient to evaluate the live stream for insertion points in real-time, as discussed elsewhere herein. In some embodiments, the server system 106 receives the live stream from one or more third-party content management systems (e.g., Uplynk). In some embodiments, a content provider interface engine (e.g., content provider interface engine 408) receives the live stream.

In some embodiments, the server system 106 may receive and/or provide a live stream in a raw and/or a processed format. For example, the server system 106 may receive a raw formatted live stream (e.g., from a camera at a live event) and process the raw formatted live stream (e.g., using a converter). The server system 106 may operate on the processed live stream (e.g., stitching advertisements and/or the like). The processed live stream may be converted back to the raw format (e.g., via the converter), and provided to a target system (e.g., a consumer system) directly and/or indirectly, as discussed elsewhere herein.

In step 1308, the server system 106 receives a playlist from the content provider system 104. The playlist may include location identifiers (e.g., URIs, URLs, domains) of corresponding segments. The segments may be marked and/or unmarked. The location identifiers of the playlist may be associated with one or more domains of the content provider system (e.g., a domain associated with HBO). In some embodiments, the content provider interface engine 408 receives the playlist.

In step 1310, the server system 106 stores the segments of the live stream in the database 422. The server system 106 may also store the playlist in the database 422. The segments and/or playlist may be stored temporarily (e.g., cached) and/or persistently. In some embodiments, the content processing engine 418 stores the segments in the database 422.

In step 1312, the server system 106 obtains one or more types of insertion point detection configurations. In some embodiments, the server system 106 determines the type of insertion point detection configuration to obtain based on the playlist, live stream, and/or segments of the live stream. For example, the live stream may include metadata indicating a type of insertion point detection. In some embodiments, the server system 106 may obtain types of insertion point detection configuration in response to user input (e.g., administrator input).

In step 1314, the server system 106 searches for insertion points in the segments of the live stream. For example, the server system 106 may use an obtained insertion point detection configuration. The server system 106 may detect insertion points in real-time (e.g., at substantially the same time as the live stream is received by the server system 106, and/or as the live stream is requested by the consumer system 108). Similarly, some or all of the other steps of flowchart 1300 may be performed in real-time. This may allow, for example, dynamic stitching of advertisements in streaming content without requiring evaluation of segments prior to the start of a live stream (e.g., a 9 PM live stream of Game of Thrones). In some embodiments, the insertion point detector engine detects the insertion points. In some embodiments, the server system 106 evaluates segments a predetermined number of segments ahead of a current segment currently being played back or about to be played back. In some embodiments, the server system 106 may discard segments without insertion points, and may generate the playlist to include the location identifier of the content provider 104. In some embodiments, the server system 106 updates the playlist on the consumer system 108 ahead of segment playback requests of the consumer system 108. In some embodiments, the server system 106 receives several segments of a live stream, evaluates a subset of the several segments received to detect insertion points, and updates the playlist based on the evaluated subset of received segments.

In step 1316, the server system 106 stores the insertion points in database 422. For example, the insertion points may be stored in a list and/or other structure. The stored insertion points may comprise timing and/or other information. For example, insertion points may be stored as a table with entries for each segment including an insertion point, and each entry may include relative and/or absolute timing information of the insertion point (e.g., a time or location information relative to a point in the segment and/or time or location information relative to the entire live stream). In some embodiments, the content processing engine and/or a playlist creator engine (e.g., playlist creator engine 908) stores the insertion points in the database 422.

In step 1318, the server system 106 generates (or, "builds") an updated playlist from the playlist and the insertion points. If no insertion points have been detected, the updated playlist may be generated just from the playlist, and/or may be the playlist itself. In some embodiments, the server system 106 converts the location identifiers of the playlist to one or more other location identifiers. For example, the server system 106 may convert the location identifiers of the playlist to one or more location identifiers of the server system 106 and/or associated server(s) (e.g., a proxy server). For example, using a proxy server may cause the appearance that some or all segments of the live stream are sourced from a particular location (e.g., the server system 106) instead of an actual source location (e.g., the content provider system 104). The proxy server may implement a 302 redirect mechanism, and/or other redirect or spoofing mechanism. The location identifiers of the updated playlist may identify one or more streaming source locations (e.g., streaming source locations of the server system 106, content provider system 104, and/or the advertisement provider system 102) and/or may be used to identify a streaming source location. For example, the location identifiers of the playlist may redirect to the streaming source location. In some embodiments, the playlist creator engine 908 builds the updated playlist.

In some embodiments, the updated playlist includes location identifiers for portions of segments. For example, the playlist received from the content provider system 104 may include a first location identifier of a first segment, a second location of a second segment, and a third location identifier of a third segment, and the server system 106 may have detected an insertion point in the second segment, but not in the first or third segments. In such an example, the server system 106 may generate an updated playlist comprising a first location identifier associated with the first segment, a second location identifier associated with a first portion of the second segment (e.g., the portion of second segment before the insertion point), a third location identifier associated with an advertisement, a fourth location identifier associated with a second portion of the second segment (e.g., the portion of the second segment after the insertion point), and a fifth location identifier associated with the third segment. In some embodiments, the server system 106 may stitch the one or more advertisement directly into the second segment, so that the second location identifier is associated with the second segment modified to include the one or more advertisements. In some embodiments, the server system 106 may itself manage the retrieving and streaming of the one or more advertisements. Thus, the second location identifier may be associated with the second segment. The server system 106 may stream the first portion of the second segment, stream the one or more advertisement, and then stream the second portion of the second segment in response to receiving the request for the second segment from the consumer system 108. Other additions and/or alternatives are also possible.

In some embodiments, a user (e.g., an administrator) may build the updated playlist. For example, the user may select an order of the segments to play, and/or how to break up segments in order to stream advertisements. In some embodiments, the administrator app may be used to cooperate with the playlist creator engine 908 to build the updated playlist.

In some embodiments, the server system 106 builds the updated playlist on a consumer-by-consumer basis. For example, the server system 106 may build the updated playlist based on when the consumer requests the live stream (e.g., before or during a start time of the live stream), and/or other parameters. For example, advertisements may be targeted for the consumer requesting the live stream. Accordingly, different consumer systems 108 may receive different updated playlists for the same live stream.

In some embodiments, advertisement slots (e.g., as indicated by an insertion point) may have a uniform duration. This may ensure synchronous presentation of the live stream across different consumer systems 108. For example, an advertisement slot may be 3 minutes, and different consumer systems 108 may receive the same or different advertisements in that slot. If an advertisement has a duration less than the duration of the slot, other information may be presented (e.g., custom frames).

In some embodiments, advertisement slots may not have a uniform duration, which may cause asynchronous presentation of content across different consumer systems 108. For example, a live stream may start at 9 PM, but depending on the selected advertisements, an end time of the live stream may be different for different consumer systems 108.

In step 1320, the server system 106 provides the updated playlist to the consumer system 108. In some embodiments, a consumer system interface engine (e.g., consumer system interface engine 404) provides the updated playlist to the consumer system 108.

In step 1322, the consumer system 108 requests one or more segments based on the updated playlist. For example, the consumer system 108 may request the one or more segments from a system (e.g., server system 106) and/or domain associated with the location identifiers of the updated playlist. For example, the request may comprise one or more URLs pointing to a location of the server system 106. In step 1324, the server system 106 provides the request to the database 422. In step 1326, the database 422 provides the requested one or more segments to the server system 106.

In step 1328, the server system 106 provides one or more segments and/or portions of segments to the consumer system 108, and the consumer system 108 renders the segments and/or portions of segments. In some embodiments, the server system 106 may provide the one or more segments and/or portions of segments directly and/or indirectly (e.g., through a proxy server, third-party content server, and/or the like) to the consumer system 108. The server system 106 may select and provide the one or more segments and/or portions of segments based on the updated playlist. The server system 106 may provide one or more segments and/or portions of segments up until an insertion point. For example, the server system 106 may provide a first segment and a first portion of a second segment before an insertion point of the second segment (e.g., as identified from the insertion points stored in step 1316). In some embodiments, the consumer interface engine provides the one or more segments and/or portions of segments to the consumer system 108, and a playback system (e.g., playback system 124) performs the rendering.

As discussed elsewhere herein, advertainments may be provided by including advertisements within segments (e.g., by modifying a segment to include an advertisement), and/or by pausing a segment of the live stream, and then streaming the advertisement, after which the live stream may be resumed. Advertisements may be received and/or provided from one or more advertisement provider systems.

Although steps 1322-1328 depict interactions between the consumer system 108, server system 106 and database 422, it will be appreciated that other systems be used (e.g., based on the updated playlist). For example, segments, or portions thereof, may be requested from the content provider system 104 and/or advertisement provider system 102.

In step 1330, the consumer system 106 provides a request for one or more advertisements to the advertisement provider system 102 based on the updated playlist. For example, the request may comprise a location identifier of one or more stream-enabled advertisements to be streamed after completion of a first portion of a segment with an insertion point. In some embodiments, the request may be provided to the server system 106 instead of the advertisement provider system 102 (e.g., for handling by the server system 106 itself, and/or forwarding to the advertisement provider system 102). In some embodiments, an advertisement provider interface engine (e.g., advertisement provider interface engine 412) provides the request to the advertisement provider system 102.

In step 1332, the advertisement provider system 102 provides the one or more advertisements to the consumer system 108 in response to the request for the one or more advertisements, and the consumer system 108 renders the one or more advertisements. In some embodiments, the one or more advertisements are provided directly from the advertisement provider system 102 to the consumer system 108 (e.g., without requiring routing, or other assistance, from the server system 106). In some embodiments, the advertisements may be streamed from, or through, the server system 106 instead of from the advertisement provider system 102 to the consumer system 108.

In step 1334, the server system 106 provides one or more segments and/or portions of segments to the consumer system 108, and the consumer system 108 renders the segments and/or portions of segments. The server system 106 may select and provide the one or more segments and/or portions of segments based on the updated playlist. The server system 106 may provide one or more segments and/or portions of segments after an insertion point up until another insertion point reached, or until the end of a last segment of the updated playlist is reached. For example, the server system 106 may provide a second portion of a second segment after an insertion point of the second segment (e.g., as identified from the insertion points stored in step 1316).

Some or all of the steps 1302-1334 may be repeated, in various orders and/or in parallel, until the live stream is terminated (e.g., upon reaching an end of the live stream, in response to consumer input, and/or the like). For example, some or all of the step 1302-1334 may be repeated sequentially and/or in parallel after the last segment of the updated playlist is streamed to the consumer system 108, or after all of the segments of the playlist received from the content provider system 104 are evaluated for insertion points by the server system 106, and/or upon receiving additional live stream segments and/or playlist(s) from the content provider system 104. Accordingly, unlike other playlists, the updated playlist may be continuously updated (or, "refreshed") until an end of the live stream is reached (e.g., an end of an episode of Game of Thrones).

In various embodiments, a live stream of a content item may include one or more streams of one or more content items. The methods described herein may be applied to one or more streams of one or more content items (e.g., serially and/or in parallel).

Figure 14:
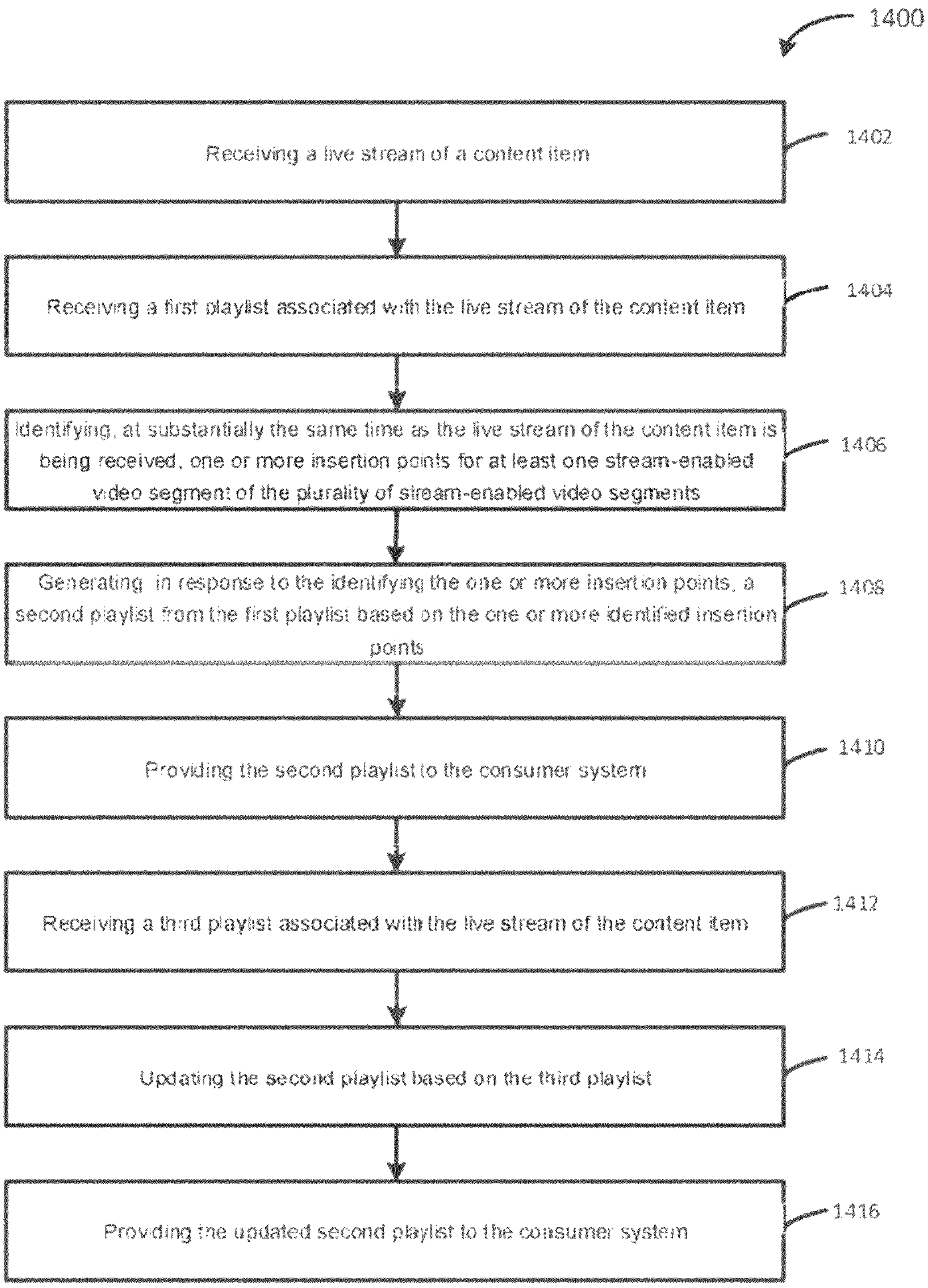
FIG. 14 depicts a flowchart illustrating a method of dynamically stitching one or more advertisements in a live stream of a content item according to some embodiments.

FIG. 14 depicts a flowchart 1400 illustrating a method of dynamically stitching one or more advertisements in a live stream of a content item according to some embodiments.

In step 1402, a server system (e.g., server system 106) receives a live stream of a content item. The live stream of the content item may comprise a plurality of stream-enabled video segments (or, simply, "segments"). For example, the content item may be VOD content (e.g., an episode of Game of Thrones). The VOD content may comprise 25 segments, which may be received by live stream in sets of one or more segments. The plurality of stream-enabled segments may comprise a first set of the one or more segments (e.g., segments 1-3 of the 25 segments). Alternatively, the plurality of stream-enabled segments may comprise all of the segments associated with the content item (e.g., all 25 segments of an episode of Game of Thrones). In some embodiments, a content provider interface engine (e.g., content provider interface engine 408) and/or a content processing engine (e.g., content processing engine 418) receives the live stream.

In another example, the content item may comprise a live event (e.g., a live basketball games). The plurality of stream-enabled segments may comprise a predetermined duration of the live event (e.g., 30 seconds) sufficient to allow the server system to identify insertion points in real-time, as discussed elsewhere herein.

In step 1404, the server system receives a first playlist associated with the live stream of the content item. The first playlist may comprise a respective first location identifier for one or more of the plurality of stream-enabled video segments. In some embodiments, the playlist is provided by a content provider system (e.g., content provider system 104) providing the content item. For example, the playlist may comprise location identifiers associated with a domain of HBO, and each of the location identifier may comprise a URI for streaming a corresponding segment of the content item. In some embodiments, the content provider interface engine receives the playlist.

In step 1406, the server system identifies one or more insertion points for at least one stream-enabled video segment of the plurality of stream-enabled video segments. The identification may be based on a predetermined configuration of a type of insertion point detection (e.g., detecting black frames, detecting custom frames, detecting manual insertion points, and/or the like). In some embodiments, the server system identifies the insertion points in real-time (e.g., at substantially the same time as the live stream of the content item is being received) and/or ahead of the playback segment currently being streamed or ready to be streamed. In some embodiments, an insertion point detector engine (e.g., insertion point detector engine 304) detects the insertion points. In some embodiments, the server system may evaluate multiple segments in parallel.

In step 1408, the server system generates a second playlist from the first playlist based on the one or more identified insertion points. The server system may generate the second playlist in response to identifying the one or more insertion points. The second playlist may be configured to facilitate live streaming to a consumer system. In some embodiments, the server system 106 generates the second playlist after (e.g., immediately after a segment is evaluated, after a predetermined number of segments is evaluated), and/or while, the server system 106 identifies the one or more insertion points. In some embodiments, a content processing engine (e.g., content processing engine 418), video slicer engine (e.g., video slicer engine 904), and/or playlist creator engine (e.g., playlist creator engine 908) generates the second playlist.

In some embodiments, the second playlist comprises a second location identifier, a third location identifier, and a fourth location identifier. The second location identifier may be associated with a first portion of a first segment of the at least one stream-enabled segment determined to have the one or more insertion points. For example, the first portion may be the portion of the first segment before a particular insertion point of the first segment. The third location identifier may be associated with a second portion of the first segment of the at least one stream-enabled segment determined to have the one or more insertion points. For example, the second portion may be the portion of the first segment after the particular insertion point. The fourth location identifier may be associated with a stream-enabled advertisement (e.g., provided an advertisement provider system or the server system). In some embodiments, the second location identifier may be associated with the second segment modified to include the one or more advertisements. In some embodiments, the second location identifier may be associated with the second segment, such that the server system 106 may stream the first portion of the second segment, stream the one or more advertisements, and then stream the second portion of the second segment in response to the request from the consumer system. Other additions and/or alternatives are also possible.

In step 1410, the server system provides the second playlist to the consumer system. In some embodiments, a consumer system interface engine (e.g., consumer system interface engine 404) provides the second playlist to the consumer system.

In step 1412, the server system receives a third playlist associated with the live stream of the content item. The third playlist may identify one or more subsequent stream-enabled video segments of the live stream of the content item. For example, third playlist may comprise location identifiers for segments 4-6 of a 25-segment episode of Game of Thrones. In some embodiments, the content provider interface engine and/or the content processing engine receives the third playlist from the content provider system.

In step 1414, the server system updates the second playlist based on the third playlist. In some embodiments, the server system 106 may replace the location identifiers of the second playlist with location identifiers associated with the location identifiers of the third playlist and location identifiers of one or more advertisements. For example, the server system may "split" segments (e.g., logically split segments and/or physically split segments) with detected insertion points into different portions, associate location identifiers with the different portions, add location identifiers for advertisements, and so forth. It will be appreciated that updating the second playlist may include creating a new playlist. In some embodiments, the content processing engine, the video slicer engine, and/or the playlist creator engine updates the second playlist.

In some embodiments, the server system updates the second playlist in response to receiving another playlist (e.g., the third playlist), receiving additional stream-enabled video segments (e.g., the stream-enabled video segments associated with the third playlist), and/or user input (e.g., input from an administrator defining some or all of the playlist).

In step 1416, the server system provides the updated second playlist to the consumer system. In some embodiments, the updated second playlist allows the consumer system to live stream the first portion of the first segment of the at least one stream-enabled segment including the one or more insertion points until an end of the first portion (e.g., as defined in accordance with a particular insertion point of the one or more insertion points). Immediately following the first portion, the consumer system can then stream an advertisement. Immediately following the advertisement, or a predefined advertainment slot (e.g., a 3-minute advertisement slot), the consumer system can stream a second portion of the first segment of the at least one stream-enabled segment. In some embodiments, the consumer system interface engine provides the updated playlist to the consumer system.

Figure 15:
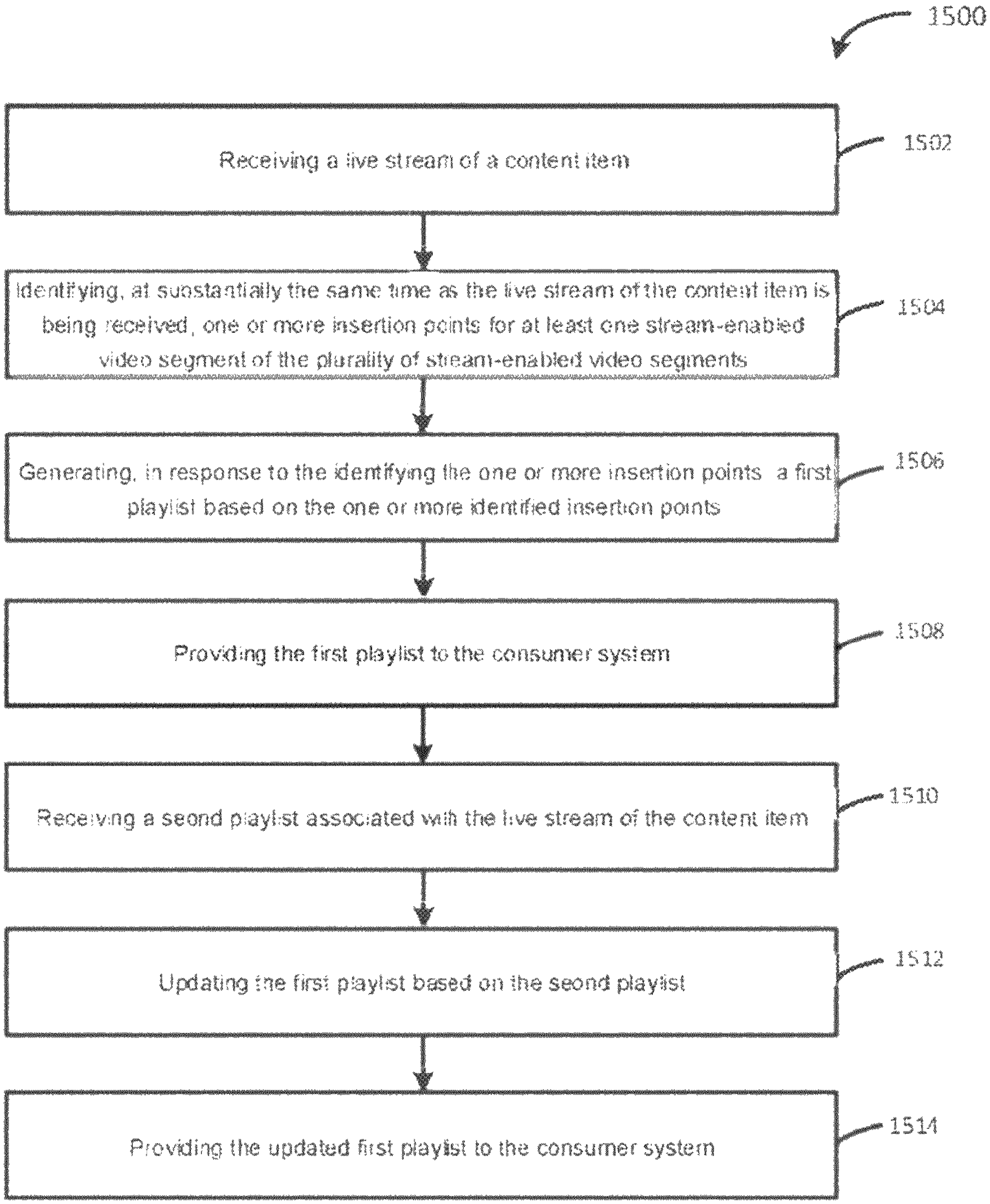
FIG. 15 depicts a flowchart illustrating a method of dynamically stitching one or more advertisements in a live stream of a content item according to some embodiments.

FIG. 15 depicts a flowchart 1500 illustrating a method of dynamically stitching one or more advertisements in a live stream of a content item according to some embodiments.

In step 1502, a server system (e.g., server system 106) receives a live stream of a content item. The live stream of the content item may comprise a plurality of stream-enabled video segments (or, simply, "segments"). For example, the content item may be VOD content (e.g., an episode of Game of Thrones). The VOD content may comprise 25 segments, which may be received by live stream in sets of one or more segments. The plurality of stream-enabled segments may comprise a first set of the one or more segments (e.g., segments 1-3 of the 25 segments). Alternatively, the plurality of stream-enabled segments may comprise all of the segments associated with the content item (e.g., all 25 segments of an episode of Game of Thrones). In some embodiments, a content provider interface engine (e.g., content provider interface engine 408) and/or a content processing engine (e.g., content processing engine 418) receives the live stream.

In another example, the content item may comprise a live event (e.g., a live basketball games). The plurality of stream-enabled segments may comprise a predetermined duration of the live event (e.g., 30 seconds) sufficient to allow the server system to identify insertion points in real-time, as discussed elsewhere herein.

In step 1504, the server system identifies one or more insertion points for at least one stream-enabled video segment of the plurality of stream-enabled video segments. The identification may be based on a predetermined configuration of a type of insertion point detection (e.g., detecting black frames, detecting custom frames, detecting manual insertion points, and/or the like). In some embodiments, the server system identifies the insertion points in real-time (e.g., at substantially the same time as the live stream of the content item is being received) and/or ahead of the playback segment currently being streamed or ready to be streamed. In some embodiments, an insertion point detector engine (e.g., insertion point detector engine 304) detects the insertion points. In some embodiments, the server system may evaluate multiple segments in parallel.

In step 1506, the server system generates a first playlist from based on the one or more identified insertion points. The server system may generate the first playlist in response to identifying the one or more insertion points. The first playlist may be configured to facilitate live streaming to a consumer system. In some embodiments, the server system 106 generates the first playlist after (e.g., immediately after a segment is evaluated, after a predetermined number of segments is evaluated), and/or while, the server system 106 identifies the one or more insertion points. In some embodiments, a content processing engine (e.g., content processing engine 418), video slicer engine (e.g., video slicer engine 904), and/or playlist creator engine (e.g., playlist creator engine 908) generates the first playlist.

In some embodiments, the first playlist comprises a second location identifier, a third location identifier, and a fourth location identifier. The second location identifier may be associated with a first portion of a first segment of the at least one stream-enabled segment determined to have the one or more insertion points. For example, the first portion may be the portion of the first segment before a particular insertion point of the first segment. The third location identifier may be associated with a second portion of the first segment of the at least one stream-enabled segment determined to have the one or more insertion points. For example, the second portion may be the portion of the first segment after the particular insertion point. The fourth location identifier may be associated with a stream-enabled advertisement (e.g., provided an advertisement provider system or the server system). In some embodiments, the second location identifier may be associated with the second segment modified to include the one or more advertisements. In some embodiments, the second location identifier may be associated with the second segment, such that the server system 106 may stream the first portion of the second segment, stream the one or more advertisements, and then stream the second portion of the second segment in response to the request from the consumer system. Other additions and/or alternatives are also possible.

In step 1508, the server system provides the first playlist to the consumer system. In some embodiments, a consumer system interface engine (e.g., consumer system interface engine 404) provides the first playlist to the consumer system.

In step 1510, the server system receives a second playlist associated with the live stream of the content item. The second playlist may identify one or more subsequent stream-enabled video segments of the live stream of the content item. For example, second playlist may comprise location identifiers for segments 4-6 of a 25-segment episode of Game of Thrones. In some embodiments, the content provider interface engine and/or the content processing engine receives the second playlist from the content provider system.

In step 1512, the server system updates the first playlist based on the second playlist. In some embodiments, the server system 106 may replace the location identifiers of the first playlist with location identifiers associated with the location identifiers of the second playlist and location identifiers of one or more advertisements. For example, the server system may "split" segments (e.g., logically split segments and/or physically split segments) with detected insertion points into different portions, associate location identifiers with the different portions, add location identifiers for advertisements, and so forth. It will be appreciated that updating the first playlist may include creating a new playlist. In some embodiments, the content processing engine, the video slicer engine, and/or the playlist creator engine updates the first playlist.

In some embodiments, the server system updates the first playlist in response to receiving another playlist (e.g., the second playlist), receiving additional stream-enabled video segments (e.g., the stream-enabled video segments associated with the second playlist), and/or user input (e.g., input from an administrator defining some or all of the playlist).

In step 1514, the server system provides the updated first playlist to the consumer system. In some embodiments, the updated first playlist allows the consumer system to live stream the first portion of the first segment of the at least one stream-enabled segment including the one or more insertion points until an end of the first portion (e.g., as defined in accordance with a particular insertion point of the one or more insertion points). Immediately following the first portion, the consumer system can then stream an advertisement. Immediately following the advertisement, or a predefined advertainment slot (e.g., a 3-minute advertisement slot), the consumer system can stream a second portion of the first segment of the at least one stream-enabled segment. In some embodiments, the consumer system interface engine provides the updated playlist to the consumer system.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A server system comprising:

one or more processors; and memory storing instructions that, when executed by the one or more processors, cause the server system to perform:

receiving one or more stream-enabled advertisements;

receiving a content item and a provider playlist associated with the content item stored at a remote content provider system, the content item comprising a plurality of stream-enabled video segments, the plurality of stream-enabled video segments including a first stream-enabled video segment having an advertisement insertion point, the plurality of stream-enabled video segments including a second stream-enabled video segment without any advertisement insertion points;

identifying the advertisement insertion point in the first stream-enabled video segment, thereby identifying a first segment portion of the first stream-enabled video segment to be played before the advertisement insertion point and identifying a second segment portion of the first stream-enabled video segment to be played after the advertisement insertion point;

storing the first segment portion and the second segment portion at a first streaming source location;

identifying no advertisement insertion points in the second stream-enabled video segment;

in response to identifying no advertisement insertion points in the second stream-enabled video segment, discarding the second stream-enabled video segment;

generating a consumer playlist, the consumer playlist comprising at least one first identifier and at least one second identifier, the at least one first identifier identifying the first segment portion, the one or more stream-enabled advertisements and the second segment portion at the first streaming source location, the at least one second identifier identifying the second stream-enabled video segment at a second streaming source location associated with the remote content provider system, the at least one second identifier being generated from the provider playlist;

providing the consumer playlist to a consumer system, the consumer playlist allowing the consumer system to:

use the at least one first identifier to stream the first segment portion, the one or more stream-enabled advertisements after streaming the first segment portion, and the second segment portion after streaming the one or more stream-enabled advertisements from the first streaming source location, and use the at least one second identifier to stream the second stream-enabled video segment from the second streaming source location;

receiving a request from the consumer system to stream the first segment portion; and streaming the first segment portion to the consumer system in response to the request.

2. The server system of claim 1, wherein the one or more stream-enabled advertisements comprise stream-enabled video.

3. The server system of claim 1, further comprising removing the advertisement insertion point by removing a set of one or more sequential black frames from the first stream-enabled video segment.

4. The server system of claim 1, wherein the first streaming source location comprises a domain associated with the server system.

5. The server system of claim 1, wherein the second streaming source location comprises a domain associated with the remote content provider system.

6. The server system of claim 1, wherein each of the at least one first identifier and the at least one second identifier comprises a respective uniform resource locator (URL).

7. A method, comprising:

receiving one or more stream-enabled advertisements;

receiving a content item and a provider playlist associated with the content item stored at a remote content provider system, the content item comprising a plurality of stream-enabled video segments, the plurality of stream-enabled video segments including a first stream-enabled video segment having an advertisement insertion point, the plurality of stream-enabled video segments including a second stream-enabled video segment without any advertisement insertion points;

identifying the advertisement insertion point in the first stream-enabled video segment, thereby identifying a first segment portion of the first stream-enabled video segment to be played before the advertisement insertion point and identifying a second segment portion of the first stream-enabled video segment to be played after the advertisement insertion point;

storing the first segment portion and the second segment portion at a first streaming source location;

identifying no advertisement insertion points in the second stream-enabled video segment;

in response to identifying no advertisement insertion points in the second stream-enabled video segment, discarding the second stream-enabled video segment;

generating a consumer playlist, the consumer playlist comprising at least one first identifier and at least one second identifier, the at least one first identifier identifying the first segment portion, the one or more stream-enabled advertisements and the second segment portion at the first streaming source location, the at least one second identifier identifying the second stream-enabled video segment at a second streaming source location associated with the remote content provider system, the at least one second identifier being generated from the provider playlist;

providing the consumer playlist to a consumer system, the consumer playlist allowing the consumer system to:

use the at least one first identifier to stream the first segment portion, the one or more stream-enabled advertisements after streaming the first segment portion, and the second segment portion after streaming the one or more stream-enabled advertisements from the first streaming source location, and use the at least one second identifier to stream the second stream-enabled video segment from the second streaming source location;

receiving a request from the consumer system to stream the first segment portion; and streaming the first segment portion to the consumer system in response to the request.

8. The method of claim 7, wherein the one or more stream-enabled advertisements comprise stream-enabled video.

9. The method of claim 7, further comprising removing the advertisement insertion point by removing a set of one or more sequential black frames from the first stream-enabled video segment.

10. The method of claim 7, wherein the first streaming source location comprises a domain associated with a server system.

11. The method of claim 7, wherein the second streaming source location comprises a domain associated with the remote content provider system.

12. The method of claim 7, wherein each of the at least one first identifier and the at least one second identifier comprises a respective uniform resource locator (URL).

13. A non-transitory computer readable medium comprising executable instructions, the instructions being executable by a processor to perform a method, the method comprising:

receiving one or more stream-enabled advertisements;

receiving a content item and a provider playlist associated with the content item stored at a remote content provider system, the content item comprising a plurality of stream-enabled video segments, the plurality of stream-enabled video segments including a first stream-enabled video segment having an advertisement insertion point, the plurality of stream-enabled video segments including a second stream-enabled video segment without any advertisement insertion points;

identifying the advertisement insertion point in the first stream-enabled video segment, thereby identifying a first segment portion of the first stream-enabled video segment to be played before the advertisement insertion point and identifying a second segment portion of the first stream-enabled video segment to be played after the advertisement insertion point;

storing the first segment portion and the second segment portion at a first streaming source location;

identifying no advertisement insertion points in the second stream-enabled video segment;

in response to identifying no advertisement insertion points in the second stream-enabled video segment, discarding the second stream-enabled video segment;

generating a consumer playlist, the consumer playlist comprising at least one first identifier and at least one second identifier, the at least one first identifier identifying the first segment portion, the one or more stream-enabled advertisements and the second segment portion at the first streaming source location, the at least one second identifier identifying the second stream-enabled video segment at a second streaming source location associated with the remote content provider system, the at least one second identifier being generated from the provider playlist;

providing the consumer playlist to a consumer system, the consumer playlist allowing the consumer system to:

use the at least one first identifier to stream the first segment portion, the one or more stream-enabled advertisements after streaming the first segment portion, and the second segment portion after streaming the one or more stream-enabled advertisements from the first streaming source location, and use the at least one second identifier to stream the second stream-enabled video segment from the second streaming source location;

receiving a request from the consumer system to stream the first segment portion; and streaming the first segment portion to the consumer system in response to the request.

* * * * *